United States Patent
Hosek et al.

(10) Patent No.: US 8,823,294 B2
(45) Date of Patent: Sep. 2, 2014

(54) COMMUTATION OF AN ELECTROMAGNETIC PROPULSION AND GUIDANCE SYSTEM

(75) Inventors: Martin Hosek, Lowell, MA (US); Jairo Terra Moura, Marlboro, MA (US); Christopher Hofmeister, Hampstead, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 319 days.

(21) Appl. No.: 11/769,688

(22) Filed: Jun. 27, 2007

(65) Prior Publication Data
US 2009/0001907 A1 Jan. 1, 2009

(51) Int. Cl.
*H02P 5/00* (2006.01)

(52) U.S. Cl.
USPC ........... 318/115; 318/244; 318/542; 318/733; 318/738

(58) Field of Classification Search
USPC .......................... 318/115, 244, 542, 733, 738
See application file for complete search history.

(56) References Cited

U.S. PATENT DOCUMENTS

| | | | |
|---|---|---|---|
| 2,564,221 A | 8/1951 | Hornfeck | |
| 3,205,485 A | 9/1965 | Bernard | |
| 3,560,774 A | 2/1971 | Reeves | |
| 3,697,992 A * | 10/1972 | Kleptz et al. | 342/62 |
| 3,860,843 A | 1/1975 | Kawasaki et al. | |
| 4,144,110 A | 3/1979 | Luc | |
| 4,210,865 A | 7/1980 | Nikolaev et al. | |
| 4,360,753 A | 11/1982 | Shannon | |
| 4,547,678 A * | 10/1985 | Metzner et al. | 290/40 C |
| 4,556,886 A | 12/1985 | Shimizu et al. | |
| 4,609,332 A | 9/1986 | Miki et al. | |
| 4,628,499 A | 12/1986 | Hammett | |
| 4,689,945 A | 9/1987 | Lattion et al. | |
| 4,717,874 A | 1/1988 | Ichikawa et al. | |
| 4,774,465 A | 9/1988 | Nilius | |
| 4,874,998 A | 10/1989 | Hollis, Jr. | |
| 4,904,937 A | 2/1990 | Takahashi et al. | |
| 4,922,197 A | 5/1990 | Juds et al. | |
| 4,956,945 A | 9/1990 | Ooshima | |
| 4,992,733 A | 2/1991 | Griebler | |
| 5,003,260 A | 3/1991 | Auchterlonie | |
| 5,015,998 A | 5/1991 | Ellis et al. | |

(Continued)

FOREIGN PATENT DOCUMENTS

| | | |
|---|---|---|
| CN | 1226307 A | 8/1999 |
| EP | 129731 A1 | 1/1985 |

(Continued)

OTHER PUBLICATIONS

Gallo, C.A., Halbach Magnetic Rotor Development, NASA Glenn Research Center, Report: NASA/TM-2008-215056; E-16281, Feb. 2008, 27p, CASI.

(Continued)

*Primary Examiner* — Kawing Chan
(74) *Attorney, Agent, or Firm* — Perman & Green, LLP; Colin C. Durham

(57) ABSTRACT

A method of commutating a motor includes calculating an adjustment electrical angle, and utilizing the adjustment electrical angle in a common set of commutation equations so that the common set of commutation equations is capable of producing both one and two dimensional forces in the motor.

52 Claims, 23 Drawing Sheets

(56) References Cited

U.S. PATENT DOCUMENTS

| | | | | |
|---|---|---|---|---|
| 5,092,453 | A | 3/1992 | Bruke | |
| 5,105,113 | A | 4/1992 | Ishikura et al. | |
| 5,120,034 | A | 6/1992 | Van Engelen et al. | |
| 5,124,863 | A | 6/1992 | Koizumi et al. | |
| 5,126,610 | A | 6/1992 | Fremerey | |
| 5,202,695 | A * | 4/1993 | Hollandsworth et al. | 342/359 |
| 5,204,621 | A | 4/1993 | Hermann et al. | |
| 5,210,490 | A | 5/1993 | Munch et al. | |
| 5,270,600 | A | 12/1993 | Hashimoto | |
| 5,285,154 | A | 2/1994 | Burreson | |
| 5,324,155 | A | 6/1994 | Goodwin et al. | |
| 5,334,892 | A | 8/1994 | Chitayat | |
| 5,351,004 | A | 9/1994 | Daniels et al. | |
| 5,386,738 | A | 2/1995 | Havenhill | |
| 5,444,368 | A | 8/1995 | Horber | |
| 5,450,009 | A | 9/1995 | Murakami | |
| 5,469,053 | A | 11/1995 | Laughlin | |
| 5,530,306 | A | 6/1996 | Ueyama | |
| 5,532,531 | A | 7/1996 | Sakamoto | |
| 5,550,413 | A | 8/1996 | Bernus et al. | |
| 5,555,715 | A | 9/1996 | Paweletz et al. | |
| 5,568,048 | A | 10/1996 | Schroeder et al. | |
| 5,574,364 | A | 11/1996 | Kajimoto et al. | |
| 5,589,769 | A | 12/1996 | Krahn | |
| 5,606,256 | A | 2/1997 | Takei | |
| 5,625,240 | A | 4/1997 | Bernus | |
| 5,633,545 | A | 5/1997 | Albrecht et al. | |
| 5,642,298 | A | 6/1997 | Mallory et al. | |
| 5,670,876 | A | 9/1997 | Dilger et al. | |
| 5,741,113 | A | 4/1998 | Bacchi et al. | |
| 5,753,991 | A | 5/1998 | Couture et al. | |
| 5,801,721 | A | 9/1998 | Gandy et al. | |
| 5,808,389 | A | 9/1998 | Stephenson | |
| 5,808,437 | A * | 9/1998 | Schob | 318/632 |
| 5,813,823 | A | 9/1998 | Hofmeister | |
| 5,818,137 | A | 10/1998 | Nichols et al. | |
| 5,838,121 | A | 11/1998 | Fairbairn et al. | |
| 5,886,432 | A | 3/1999 | Markle | |
| 5,899,658 | A | 5/1999 | Hofmeister | |
| 5,914,548 | A | 6/1999 | Watanabe et al. | |
| 5,924,975 | A | 7/1999 | Goldowsky | |
| 5,932,947 | A | 8/1999 | Kim | |
| 5,955,882 | A | 9/1999 | Eisschiel et al. | |
| 5,961,291 | A | 10/1999 | Sakagami et al. | |
| 6,015,272 | A | 1/2000 | Antaki et al. | |
| 6,018,881 | A | 2/2000 | Spies | |
| 6,049,148 | A | 4/2000 | Nichols et al. | |
| 6,054,851 | A | 4/2000 | Masreliez et al. | |
| 6,058,760 | A | 5/2000 | Van Heyningen | |
| 6,078,119 | A | 6/2000 | Satoh et al. | |
| 6,085,760 | A | 7/2000 | Chodorow | |
| 6,086,362 | A | 7/2000 | White et al. | |
| 6,096,231 | A | 8/2000 | Schertler | |
| 6,100,618 | A | 8/2000 | Schoeb et al. | |
| 6,100,681 | A | 8/2000 | Tsuruta | |
| 6,127,749 | A | 10/2000 | Soqard | |
| 6,144,132 | A | 11/2000 | Nashiki | |
| 6,147,421 | A | 11/2000 | Hazelton | |
| 6,163,148 | A | 12/2000 | Takada et al. | |
| 6,175,174 | B1 | 1/2001 | Takahashi | |
| 6,176,668 | B1 | 1/2001 | Kurita et al. | |
| 6,189,404 | B1 | 2/2001 | Hatake et al. | |
| 6,191,415 | B1 | 2/2001 | Stridsberg | |
| 6,206,176 | B1 | 3/2001 | Blonigan et al. | |
| 6,208,045 | B1 | 3/2001 | Hazelton | |
| 6,209,045 | B1 | 3/2001 | Hasegawa et al. | |
| 6,227,817 | B1 | 5/2001 | Paden | |
| 6,235,172 | B1 | 5/2001 | Begin et al. | |
| 6,244,835 | B1 | 6/2001 | Antaki et al. | |
| 6,246,233 | B1 | 6/2001 | Griffen et al. | |
| 6,249,067 | B1 | 6/2001 | Schob et al. | |
| 6,261,247 | B1 | 7/2001 | Ishikawa et al. | |
| 6,269,552 | B1 | 8/2001 | Honda et al. | |
| 6,285,097 | B1 | 9/2001 | Hazelton | |
| 6,285,107 | B1 | 9/2001 | Sawada et al. | |
| 6,324,134 | B1 | 11/2001 | Ohtachi et al. | |
| 6,326,750 | B1 | 12/2001 | Marcinkiewicz | |
| 6,384,500 | B1 | 5/2002 | Chassoulier et al. | |
| 6,414,742 | B1 | 7/2002 | Korenaga et al. | |
| 6,416,215 | B1 | 7/2002 | Terentiev | |
| 6,431,011 | B1 | 8/2002 | Feller | |
| 6,445,093 | B1 | 9/2002 | Binnard | |
| 6,447,265 | B1 | 9/2002 | Antaki et al. | |
| 6,447,266 | B2 | 9/2002 | Antaki et al. | |
| 6,448,760 | B1 | 9/2002 | Neumann et al. | |
| 6,471,459 | B2 | 10/2002 | Blonigan et al. | |
| 6,485,531 | B1 | 11/2002 | Schöb | |
| 6,498,411 | B2 | 12/2002 | Kanebako | |
| 6,498,451 | B1 | 12/2002 | Boules et al. | |
| 6,509,732 | B1 | 1/2003 | Rhodes et al. | |
| 6,518,747 | B2 | 2/2003 | Sager et al. | |
| 6,522,130 | B1 | 2/2003 | Lutz | |
| 6,532,791 | B2 | 3/2003 | Schmid et al. | |
| 6,537,011 | B1 | 3/2003 | Wang et al. | |
| 6,557,957 | B2 | 5/2003 | Nagata et al. | |
| 6,559,567 | B2 * | 5/2003 | Schob | 310/90.5 |
| 6,559,637 | B2 | 5/2003 | Miyata et al. | |
| 6,563,306 | B2 | 5/2003 | Sato | |
| 6,573,088 | B2 | 6/2003 | Gemmell et al. | |
| 6,580,190 | B2 | 6/2003 | Takasu | |
| 6,617,739 | B1 | 9/2003 | Kinoshita | |
| 6,621,245 | B2 * | 9/2003 | Vaassen et al. | 318/648 |
| 6,625,517 | B1 | 9/2003 | Bogdanov et al. | |
| 6,642,711 | B2 | 11/2003 | Kawate et al. | |
| 6,650,079 | B2 | 11/2003 | Binnard | |
| 6,661,220 | B1 | 12/2003 | Glehr | |
| 6,690,159 | B2 | 2/2004 | Burreson et al. | |
| 6,691,074 | B1 | 2/2004 | Moriya et al. | |
| 6,698,737 | B1 | 3/2004 | Blessing | |
| 6,707,200 | B2 | 3/2004 | Carroll et al. | |
| 6,731,107 | B2 | 5/2004 | Reverdy | |
| 6,781,524 | B1 | 8/2004 | Clark et al. | |
| 6,784,580 | B2 | 8/2004 | Yashiro et al. | |
| 6,800,833 | B2 | 10/2004 | Gregor et al. | |
| 6,803,758 | B1 | 10/2004 | Nicholson | |
| 6,809,450 | B1 | 10/2004 | Morrison | |
| 6,810,754 | B2 | 11/2004 | May | |
| 6,813,543 | B2 | 11/2004 | Aalund et al. | |
| 6,864,955 | B2 | 3/2005 | Nishi et al. | |
| 6,876,896 | B1 | 4/2005 | Ortiz et al. | |
| 6,877,963 | B2 | 4/2005 | Beyer et al. | |
| 6,878,044 | B2 | 4/2005 | Sakurai et al. | |
| 6,879,063 | B2 | 4/2005 | Frissen et al. | |
| 6,879,076 | B2 | 4/2005 | Long | |
| 6,909,281 | B2 | 6/2005 | Grassman et al. | |
| 6,917,136 | B2 | 7/2005 | Thornton et al. | |
| 6,927,505 | B2 | 8/2005 | Binnard et al. | |
| 6,952,086 | B1 | 10/2005 | Krefta et al. | |
| 6,989,647 | B1 | 1/2006 | Lee | |
| 6,991,710 | B2 | 1/2006 | Harris et al. | |
| 7,005,847 | B2 | 2/2006 | Grassman et al. | |
| 7,023,118 | B1 | 4/2006 | Morrison | |
| 7,053,582 | B2 | 5/2006 | Ueyama et al. | |
| 7,067,952 | B2 | 6/2006 | Neal | |
| 7,070,398 | B2 | 7/2006 | Olsen et al. | |
| 7,073,521 | B2 | 7/2006 | Sakai | |
| 7,087,143 | B1 | 8/2006 | Schmidt et al. | |
| 7,115,066 | B1 | 10/2006 | Lee | |
| 7,135,855 | B2 | 11/2006 | Nyce | |
| 7,164,120 | B2 | 1/2007 | Strasser | |
| 7,187,143 | B2 | 3/2007 | Okada et al. | |
| 7,196,604 | B2 | 3/2007 | Sills et al. | |
| 7,208,945 | B2 | 4/2007 | Jones et al. | |
| 7,211,918 | B2 | 5/2007 | Migita et al. | |
| 7,229,258 | B2 | 6/2007 | Wood et al. | |
| RE39,748 | E | 7/2007 | Watanabe et al. | |
| 7,246,985 | B2 | 7/2007 | Ferrara | |
| 7,248,037 | B2 | 7/2007 | Hara et al. | |
| 7,262,527 | B2 | 8/2007 | Neal | |
| 7,264,430 | B2 | 9/2007 | Bischof et al. | |
| 7,292,656 | B2 | 11/2007 | Kloper et al. | |
| 7,325,559 | B2 | 2/2008 | Darut et al. | |
| 7,339,370 | B2 | 3/2008 | Reimer et al. | |
| 7,352,553 | B2 | 4/2008 | Kozaki et al. | |

(56) References Cited

U.S. PATENT DOCUMENTS

| | | | |
|---|---|---|---|
| 7,371,306 B2 | 5/2008 | Davis et al. | |
| 7,400,141 B2 | 7/2008 | Taniguchi et al. | |
| 7,424,830 B2 | 9/2008 | Matsusaki et al. | |
| 7,467,930 B2 | 12/2008 | Ozaki et al. | |
| 7,518,273 B2 | 4/2009 | Kataoka et al. | |
| 7,633,201 B2 | 12/2009 | Buhler et al. | |
| 7,897,025 B2 | 3/2011 | Inoue et al. | |
| 8,052,504 B2 | 11/2011 | Kalenian et al. | |
| 8,104,488 B2 | 1/2012 | Rye et al. | |
| 8,129,984 B2 | 3/2012 | Hosek et al. | |
| 2002/0041168 A1* | 4/2002 | Mann et al. | 318/254 |
| 2002/0060548 A1* | 5/2002 | Iwaji et al. | 318/727 |
| 2002/0089324 A1 | 7/2002 | Miyata et al. | |
| 2002/0105241 A1 | 8/2002 | Carroll et al. | |
| 2002/0145722 A1 | 10/2002 | Compter | |
| 2002/0149270 A1 | 10/2002 | Hazelton | |
| 2003/0056815 A1 | 3/2003 | Sakai | |
| 2003/0085676 A1 | 5/2003 | Binnard | |
| 2003/0102721 A1 | 6/2003 | Ueta et al. | |
| 2003/0111912 A1 | 6/2003 | Binnard | |
| 2003/0183611 A1 | 10/2003 | Gregor et al. | |
| 2003/0223853 A1 | 12/2003 | Caveney et al. | |
| 2004/0021437 A1* | 2/2004 | Maslov et al. | 318/254 |
| 2004/0056617 A1* | 3/2004 | Berroth et al. | 318/439 |
| 2004/0070300 A1 | 4/2004 | Fu | |
| 2004/0075426 A1 | 4/2004 | Wakiyama et al. | |
| 2004/0124729 A1 | 7/2004 | Long | |
| 2004/0151562 A1 | 8/2004 | Hoffmeister et al. | |
| 2004/0217667 A1 | 11/2004 | Popov | |
| 2004/0263000 A1 | 12/2004 | Vreugdewater | |
| 2005/0083496 A1 | 4/2005 | Dansberg | |
| 2005/0151544 A1 | 7/2005 | Mahoney et al. | |
| 2005/0184689 A1* | 8/2005 | Maslov et al. | 318/254 |
| 2005/0194843 A1 | 9/2005 | Korenaga | |
| 2005/0264119 A1* | 12/2005 | Carroll et al. | 310/90.5 |
| 2005/0269892 A1 | 12/2005 | Duff | |
| 2005/0285550 A1 | 12/2005 | Simons et al. | |
| 2006/0113949 A1* | 6/2006 | Nishimura et al. | 318/723 |
| 2006/0125473 A1 | 6/2006 | Frachon et al. | |
| 2006/0131967 A1 | 6/2006 | Lin et al. | |
| 2006/0164697 A1 | 7/2006 | Larson | |
| 2006/0205553 A1 | 9/2006 | Lee | |
| 2006/0219275 A1 | 10/2006 | Weber et al. | |
| 2006/0238053 A1 | 10/2006 | Kascak et al. | |
| 2006/0275155 A1 | 12/2006 | Thibodeau | |
| 2006/0279149 A1 | 12/2006 | Asper | |
| 2007/0120556 A1 | 5/2007 | Dufour et al. | |
| 2007/0126304 A1 | 6/2007 | Ito et al. | |
| 2007/0164697 A1 | 7/2007 | Cox et al. | |
| 2007/0194787 A1 | 8/2007 | Takahashi et al. | |
| 2007/0267920 A1 | 11/2007 | Korenaga | |
| 2007/0295089 A1 | 12/2007 | Velinsky et al. | |
| 2007/0299625 A1 | 12/2007 | Englert et al. | |
| 2008/0067968 A1 | 3/2008 | Binnard | |
| 2008/0116881 A1 | 5/2008 | May | |
| 2008/0120164 A1 | 5/2008 | Hassler | |

FOREIGN PATENT DOCUMENTS

| | | |
|---|---|---|
| EP | 0121084 | 1/1989 |
| EP | 414127 A1 | 2/1991 |
| EP | 526903 A1 | 2/1993 |
| EP | 0565746 | 10/1993 |
| EP | 641061 A2 | 3/1995 |
| EP | 675824 A1 | 10/1995 |
| EP | 758157 A2 | 2/1997 |
| EP | 760244 A1 | 3/1997 |
| EP | 816701 A1 | 1/1998 |
| EP | 1052761 A2 | 11/2000 |
| EP | 1054498 A1 | 11/2000 |
| EP | 1114648 A2 | 7/2001 |
| EP | 1176999 A1 | 2/2002 |
| EP | 0897476 B1 | 7/2002 |
| EP | 1732011 A1 | 12/2006 |
| GB | 1552874 A | 9/1979 |
| GB | 2035622 A | 6/1980 |
| JP | 61152304 | 7/1986 |
| JP | 61152304 A | 7/1986 |
| JP | 1023468 A | 1/1989 |
| JP | 1240268 A | 9/1989 |
| JP | 3125212 | 3/1990 |
| JP | 02193547 | 7/1990 |
| JP | 3178747 A | 8/1991 |
| JP | 3276317 A | 12/1991 |
| JP | 4209996 A | 7/1992 |
| JP | 4308823 A | 10/1992 |
| JP | 5130762 | 5/1993 |
| JP | 5130762 A | 5/1993 |
| JP | 623687 | 2/1994 |
| JP | 0623687 | 2/1994 |
| JP | 6213233 A | 8/1994 |
| JP | 3147568 | 9/1994 |
| JP | 7012091 A | 1/1995 |
| JP | 07255158 | 3/1995 |
| JP | 7131966 A | 5/1995 |
| JP | 07161790 | 6/1995 |
| JP | 07255158 | 10/1995 |
| JP | 8323505 | 12/1996 |
| JP | 8323505 A | 12/1996 |
| JP | 09269007 | 10/1997 |
| JP | 10023781 A | 1/1998 |
| JP | 10070865 | 3/1998 |
| JP | 2001156150 A | 6/2001 |
| JP | 2001224154 | 8/2001 |
| JP | 2001351874 A | 12/2001 |
| JP | 2002026105 A | 1/2002 |
| JP | 2002511571 A | 4/2002 |
| JP | 2004245703 A | 9/2004 |
| JP | 200368620 A | 10/2004 |
| JP | 4308823 | 11/2004 |
| JP | 2005158826 A | 6/2005 |
| JP | 2005223997 | 8/2005 |
| JP | 2005223997 A | 8/2005 |
| JP | 2005534176 A | 11/2005 |
| JP | 2006013371 A | 1/2006 |
| JP | 2006014592 | 1/2006 |
| JP | 2006214736 A | 8/2006 |
| JP | 2006014592 | 12/2006 |
| JP | 2007019216 A | 1/2007 |
| JP | 2007024694 A | 2/2007 |
| JP | 2008516457 A | 5/2008 |
| JP | 2008196894 A | 8/2008 |
| JP | 4712379 | 6/2011 |
| WO | WO8912907 A1 | 12/1989 |
| WO | WO9414653 A1 | 7/1994 |
| WO | 9742413 A1 | 11/1997 |
| WO | WO9837335 A1 | 8/1998 |
| WO | 9904481 A1 | 1/1999 |
| WO | 9953266 | 10/1999 |
| WO | WO0102211 A1 | 1/2001 |
| WO | WO0102721 A1 | 1/2001 |
| WO | WO0231372 A1 | 4/2002 |
| WO | WO0241473 A1 | 5/2002 |
| WO | WO03029651 A2 | 4/2003 |
| WO | WO2004098677 A1 | 11/2004 |
| WO | WO2005003565 A1 | 1/2005 |
| WO | WO2005030296 A2 | 4/2005 |
| WO | WO2005114848 A1 | 12/2005 |
| WO | WO2006010285 A1 | 2/2006 |
| WO | WO2006053384 A1 | 5/2006 |
| WO | 2007029623 A1 | 3/2007 |
| WO | 2007068496 | 6/2007 |
| WO | WO2008003943 A2 | 1/2008 |
| WO | 2008039943 A2 | 4/2008 |
| WO | 2009003186 A1 | 12/2008 |

OTHER PUBLICATIONS

Jansen et al, Magnetically levitated planar actuator with moving magnets, Eindhoven Univ. of Technol., Eindhoven, Netherlands, Conference: 2007 IEEE International Electric Machines and Drives Conference, p. 272-278, Publisher: IEEE, Piscataway, NJ, USA, 2007, Conference: 2007 IEEE International Electric Machines and

(56) References Cited

OTHER PUBLICATIONS

Drives Conference, May 3-5, 2007, Antalya, Turkey.
Konkola et al, Electromagnetic design of a low-fringing-field magnetic bearing stage for electron beam lithography: Special issue on magnetic bearing, Department of Mechanical Engineering, Massachussetts Institute of Technology Cambridge MA United States, JSME international journal. Series C, Mechanical systems, machine elements and manufacturing, 2003, vol. 46, No. 2, p. 370-377.
GOA et al, A surface motor-driven planar motion stage integrated with an XY0(z) surface encoder for precision positioning, Tohoku Univ, Dept Mech & Precis Engn, , Sendai, Miyagi 9808579, Japan; Sumitomo Heavy Ind Lts., Tokyo, Japan, Precision Engineering—Journal of the International Societies for Precision Engineering and Nanotechnology, 2004, vol. 28, No. 3, pp. 329-337.
Rafael Becerril Arreola, Nonlinear Control design for a Magnetic Levitation System, Thesis for Master of Applied Science, 2003, Graduate department of Electrical and computer Engineering, University of Toronto, http://www.control.utoronto.ca/lab/references/Rafael_Becerril_03.pdf.
Kim et al, Analysis and implementation of a tubular motor with Halbach magnetarray, Industry Application Conference, 1996, Thirty-First IAS Annual Meeting, IAS 1996, Conference Record of the 1996 IEEE, Publication Date Oct. 6-10, 1996, vol. 1, pp. 471-478, Meeting Dates Oct. 6, 1996-Oct. 10, 1996, San Diego, CA, USA.
Jang et al, Design and analysis of helical motion permanent magnet motor with cylindrical Halbach array, Dept of Electr Eng, Chungnam Nat. Univ., Daejeon, South Korea, Magnetics, IEEE Transactions, Publication Date Sep. 2003, vol. 39, Issue 5, Part 2, pp. 3007-3009.
Etxaniz et al, Design of Magnetically levitated 2D drive, COMPEL: The International Journal for Computation and Mathematics in Electrical and Electronic Engineering, 2006, vol. 25, Issue 3, pp. 732-740, Emerald Group Publishing Limited.
Park et al, Anaylsis and Control of 2-DOF Magnetic Levitation Stage Using Force Decoupling Theorem, Dept. of Mechatronics, Gwangju Inst. of Sci. & Technol., Paper appears in SICE-ICASE, 2006. International Joint Conference, Publication Date Oct. 2006, pp. 1091-1095, Busan.
Duan et al, Analysis and comparison of two-dimensional permanent-magnet arrays for planar motor, Dept. of Precision Instrum. & Mechanology, Tsinghua Univ., Beijing, China, This paper appears in: Magnetics, IEEE Transactions, Publication date: Nov. 2004, vol. 40, Issue 6, pp. 3490-3494.
Cho et al, Analysis and design of synchronous permanent magnet planar motors, Power Engineering Review, IEEE, Jul. 2002, vol. 22, issue 7, pp. 52-52, IEEE, USA.
NPL 1—"A Study of the Rotor Eccentricity Compensation of Bearingless Induction Motor," Zhang et al., Jun. 2004, pp. 148-150, 164 and 201, vol. 8, No. 2, Editorial Board of Electric Machines & Control, China.
NPL 2—"Static Torque Profiles of a Hybrid Stepper Motor Having Eccentricity Between Stator and Rotor Axes," Rajagopal et al., May 15, 2003, pp. 8701-8703, vol. 93, No. 10, A.I.P., Journal of Applied Physics, United States.
NPL 3—"Sinusoidal Shaft Position Encoder," Benarous et al., Mar. 31-Apr. 2, 2004, IEEE Conference Publication 2004, No. 498, pp. 132-136, IEEE International Conference on Power Electronics, Machines and Drives.
NPL 4—"Sine-Cosine Rotation Sensor for 360 Degree Angle Measurement Sensors," Wereb, J.A., 1995, pp. 40-41, vol. 12, No. 11, Elweco, Inc., United States.
NPL 5—"A New CMOS Hall Angular Position Sensor," Technisches Messen, Popovic et al., 2001, pp. 286-291, vol. 68, No. 6, June, Swiss Fed. Institute Tech., Lausanne, Switzerland.
NPL 6—"A Novel Multi-DOF Presision Positioning Methodology Using Two-Axis Hall-Effect Sensors," Kawato et al., 2005 American Control Conference, Jun. 8-10, 2005, pp. 3042-3047, IEEE.
NPL 8—"A New Two-Axis Magnetic Position Sensor," Schott et al., 2002, pp. 911-915, IEEE.
NPL 9—"The Long-Range Scanning Stage: A Novel Platform for Scanned-Probe Microscopy," Precision Engineering—Journal of the International Societies for Precision Engineering and Nanotechnology, 2000, pp. 191-209, vol. 24, Elsevier Science, Inc., United States.
NPL 10—International Search Report, PCT/US 08/68160, Sep. 11, 2008, 1 page.
NPL 11—International Preliminary Report on Patentability, PCT/US08/68160, Sep. 11, 2009, 31 pages.
NPL 12—International Search Report, PCT/US 08/68161, Oct. 22, 2008, 1 page.
NPL 13—International Search Report, PCT/US 08/68167, Sep. 11, 2008, 1 page.
NPL 14—International Preliminary Report on Patentability, PCT/US08/68167, Sep. 22, 2009, 8 pages.
NPL 15—International Search Report, PCT/US2008/068670, Sep. 2, 2008, 1 page.
NPL 16—International Search Report, PCT/US2008/068680, Sep. 3, 2008, 2 pages.
NPL 17—International Search Report, PCT/US2008/068682 Sep. 3, 2008, 1 page.
NPL 18—International Preliminary Report on Patentability, PCT/US08/68682, Aug. 12, 2009, 8 pages.
NPL 19—International Search Report, PCT/US 08/68684 Oct. 9, 2008, 1 page.
NPL 20—International Preliminary Report on Patentability, PCT/US2008/068684, Jan. 5, 2010, 5 pages.
NPL 21—"Electromagnetic induction in terms of the Maxwell force instead of magnetic flux," Science Measurement and Technology, IEEE Proceedings, Jul. 1999, vol. 146, Issue 4, pp. 182-193. (abstract).
Arreola, Rafael Becerril, Output feedback nonlinear control for a linear motor in suspension mode, Automatica, 2004, Elsevier, 2004.
Carpenter, C.J. Electromagnetic induction in terms of Maxwell force instead of magnetic flux, Science, Measurement and Technology, IEE Proceedings, Jul. 1999, vol. 146, Issue 4, pp. 182-193. (abstract) IEEE [online] [retreived on Sep. 8, 2008 (08.09.20080] Retrieved from the Internet: <URL:http://ieeexplore.1eee.org/xplifreeabs_all.jsp?tp= &arnum ber-790323&isn u mber-17150>.
Kim et al., Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.
Thornton et al., The MangeMotion Maglev System M3, TRB 2003 Annual Meeting CD-ROM, pp. 1-15, 2003.
International Preliminary Report on Patentability dated Dec. 10, 2009; Application PCT/US08/68680.
International Preliminary Report on Patentability dated Jan. 25, 2011; Application PCT/US08/68661.
Chinese Office Action in CN Application No. 200880104585.4 dated Mar. 7, 2012.
Chinese Office Action in CN Application No. 200880104666.4 dated Aug. 18, 2011.
Chinese Office Action in CN Application No. 200880104585.4dated Jan. 19, 2011.
Yan, et al, "Coding of Shared Track Grey Encoder," Journal of Dynamic Systems, Measurement, and Control, Sep. 2000, pp. 573-576, vol. 122, ASME.
International Search Report, PCT/US/2008/070346, Oct. 7, 2008.
Taiwan IPO search Report, Application No. 097124040, dated May 19, 2013, 1 page.
Taiwan IPO Search Report, Application No. 097124035, dated Jul. 31, 2013.
Taiwan IPO Search Report, Application No. 097124039 dated Aug. 1, 2013.
Taiwan IPO Search Report, Application No. 097124034 dated Aug. 1, 2013.
Chinese Search Report, Application No. 08801046679 dated Sep. 27, 2012.
International Preliminary Report of Patentability dated Jan. 19, 2010; Application PCT/US08/070346.

* cited by examiner

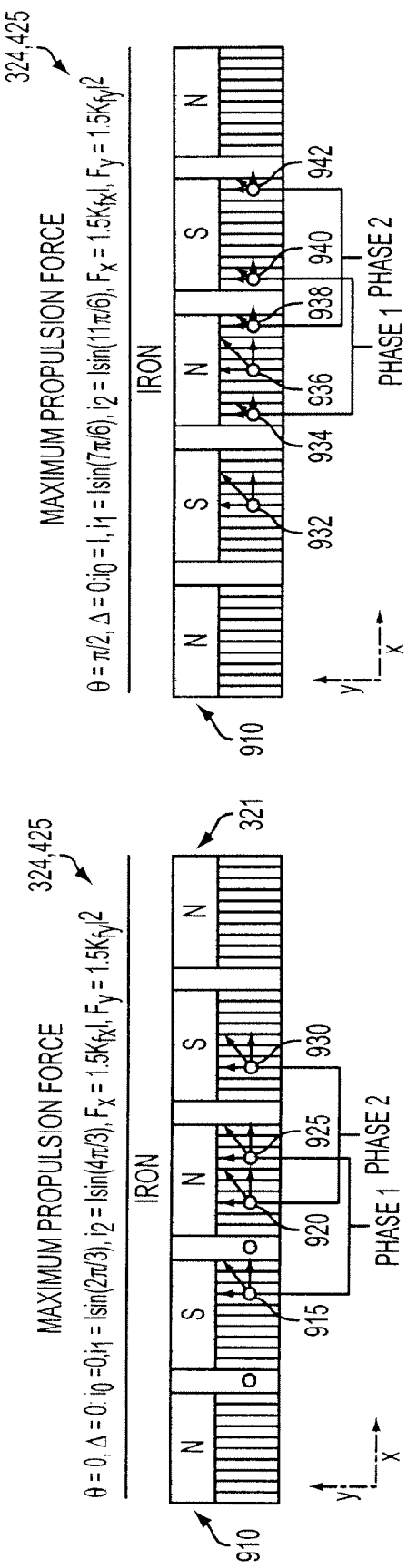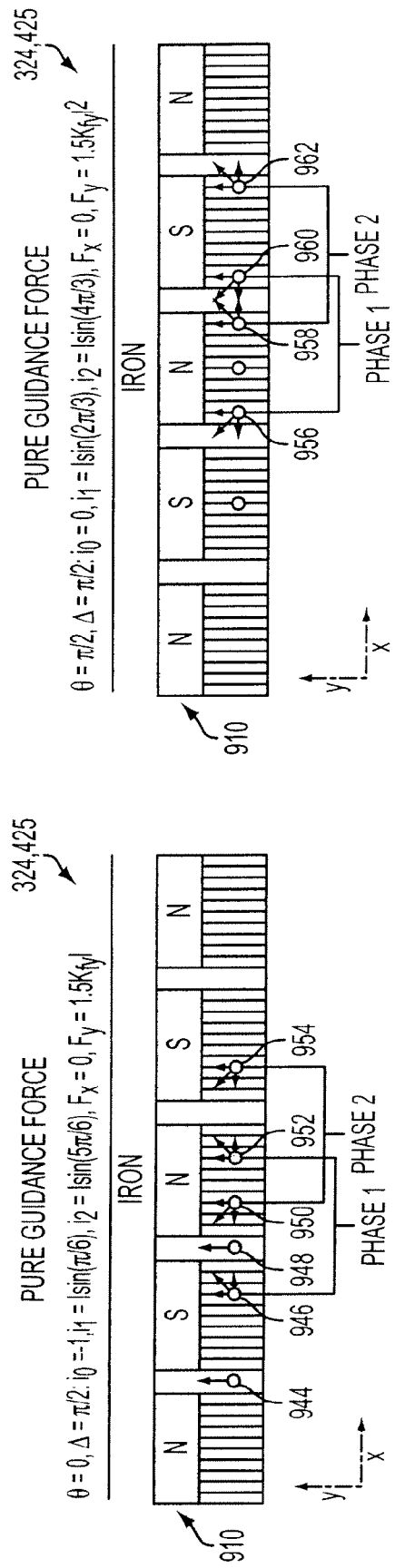

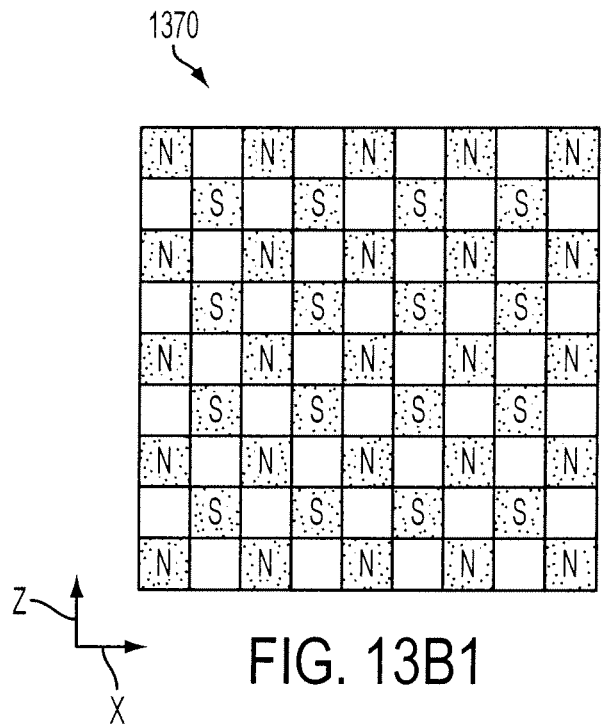
FIG. 13B1
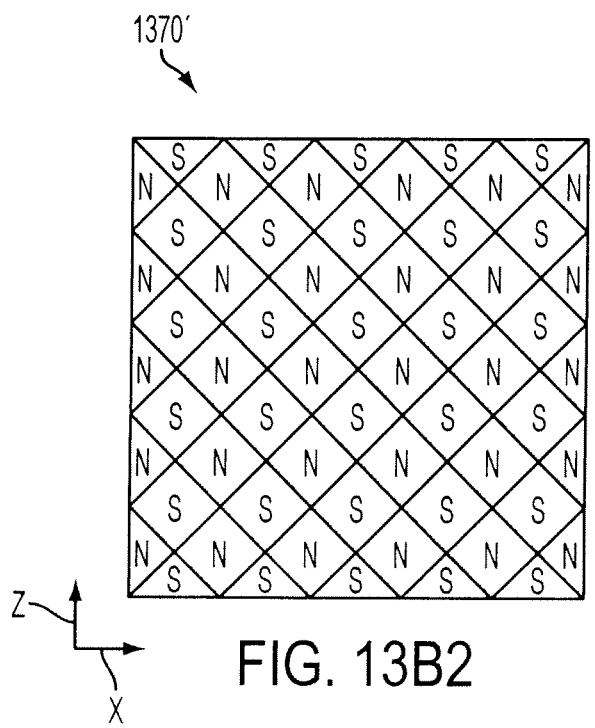
FIG. 13B2

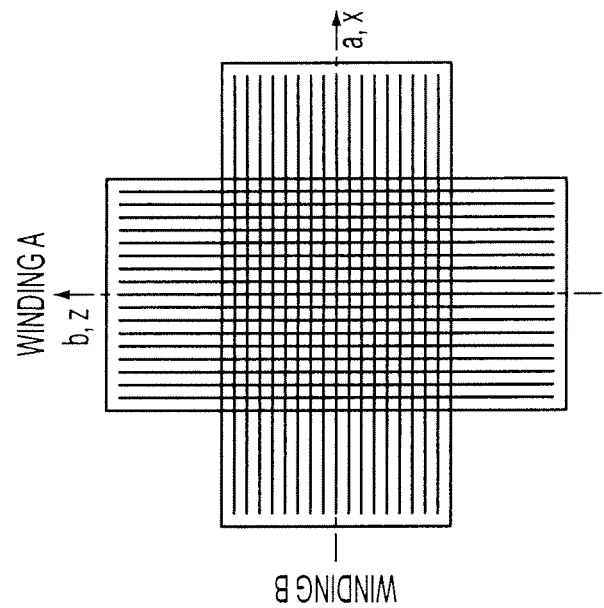
FIG. 13D2
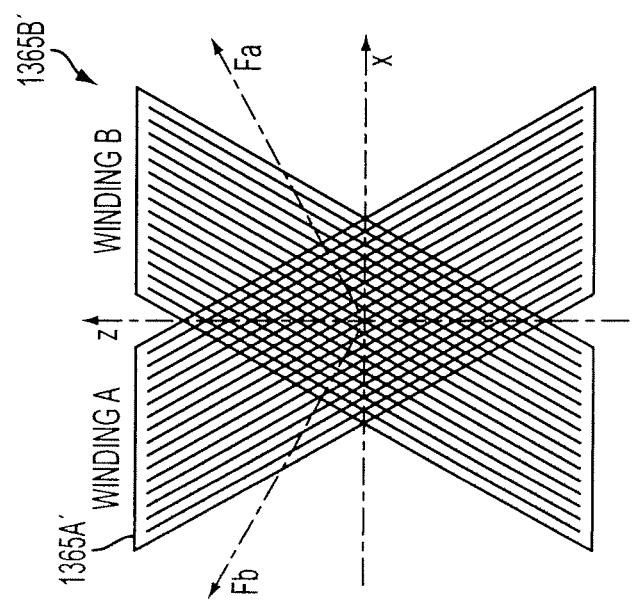
FIG. 13D1

PHASE COMMUTATION

ROLL STABILIZATION

PITCH STABILIZATION, DISCRETE FORCES

PITCH STABILIZATION, DISTRIBUTED FORCE

US 8,823,294 B2

COMMUTATION OF AN ELECTROMAGNETIC PROPULSION AND GUIDANCE SYSTEM

BACKGROUND

The embodiments described herein relate to a method and system for commutation of an electromagnetic propulsion and guidance drive, in particular for a magnetically levitated material transport platform.

BRIEF DESCRIPTION OF RELATED DEVELOPMENTS

A schematic plan view of a conventional substrate processing apparatus is shown in FIG. 1. As can been seen, the processing modules of the apparatus in FIG. 1 are placed radially around the transport chamber of the processing apparatus. A transport apparatus, which may be a conventional two or three axis of movement apparatus, for example, a robot, is centrally located in the transport chamber to transport substrates between processing modules. As can be realized, throughput of the processing apparatus is limited by the handling rate of the transport apparatus. In addition, a conventional robot requires a considerable number of active components, including joints, arms, motors, encoders, etc. A conventional robot generally has a limited number of degrees of freedom, and providing power and control for the robot generally requires breeching the envelope of the transport chamber. The disclosed embodiments overcome these and other problems of the prior art.

SUMMARY OF THE EXEMPLARY EMBODIMENTS

The disclosed embodiments are directed to a method of commutating a motor including calculating an adjustment electrical angle, and utilizing the adjustment electrical angle in a common set of commutation equations so that the common set of commutation equations is capable of producing both one and two dimensional forces in the motor.

In another embodiment, a method of commutating a motor includes calculating an adjustment electrical angle, and entering the adjustment electrical angle into commutation equations for commutating motor windings to produce forces in the motor in at least one dimension, wherein the adjustment electrical angle is determined so that commutation equations for producing forces in the motor in but one of the at least one dimension are common with commutation equations for simultaneously producing forces in the motor in two of the at least one dimension.

In another embodiment, an apparatus for commutating a motor includes circuitry for calculating an adjustment electrical angle, and an amplifier operable to utilize the adjustment electrical angle in a common set of commutation equations so that the common set of commutation equations is capable of producing both one and two dimensional forces in the motor.

In still another embodiment, a motor has windings commutated by a controller, where the controller includes circuitry for calculating an adjustment electrical angle, and an amplifier operable to utilize the adjustment electrical angle in a common set of commutation equations so that the common set of commutation equations is capable of producing both one and two dimensional forces in the motor.

In yet a further embodiment, a substrate processing apparatus has a controller for commutating a motor including circuitry for calculating an adjustment electrical angle, and an amplifier operable to utilize the adjustment electrical angle in a common set of commutation equations so that the common set of commutation equations is capable of producing both one and two dimensional forces in the motor.

BRIEF DESCRIPTION OF THE DRAWINGS

The foregoing aspects and other features of the present invention are explained in the following description, taken in connection with the accompanying drawings, wherein:

FIGS. 9A-9D show force vectors acting between a forcer and platen that provide propulsion in the x direction resulting from Lorentz forces, and guidance in the y direction resulting from Maxwell forces;

FIGS. 13B1-13B2 are schematic views of respective magnet array(s) in accordance with different exemplary embodiments;

FIG. 13D1-13D2 are schematic views of respective winding arrangements in accordance with different exemplary embodiments;

DETAILED DESCRIPTION OF THE EXEMPLARY EMBODIMENTS

Figure 2A:
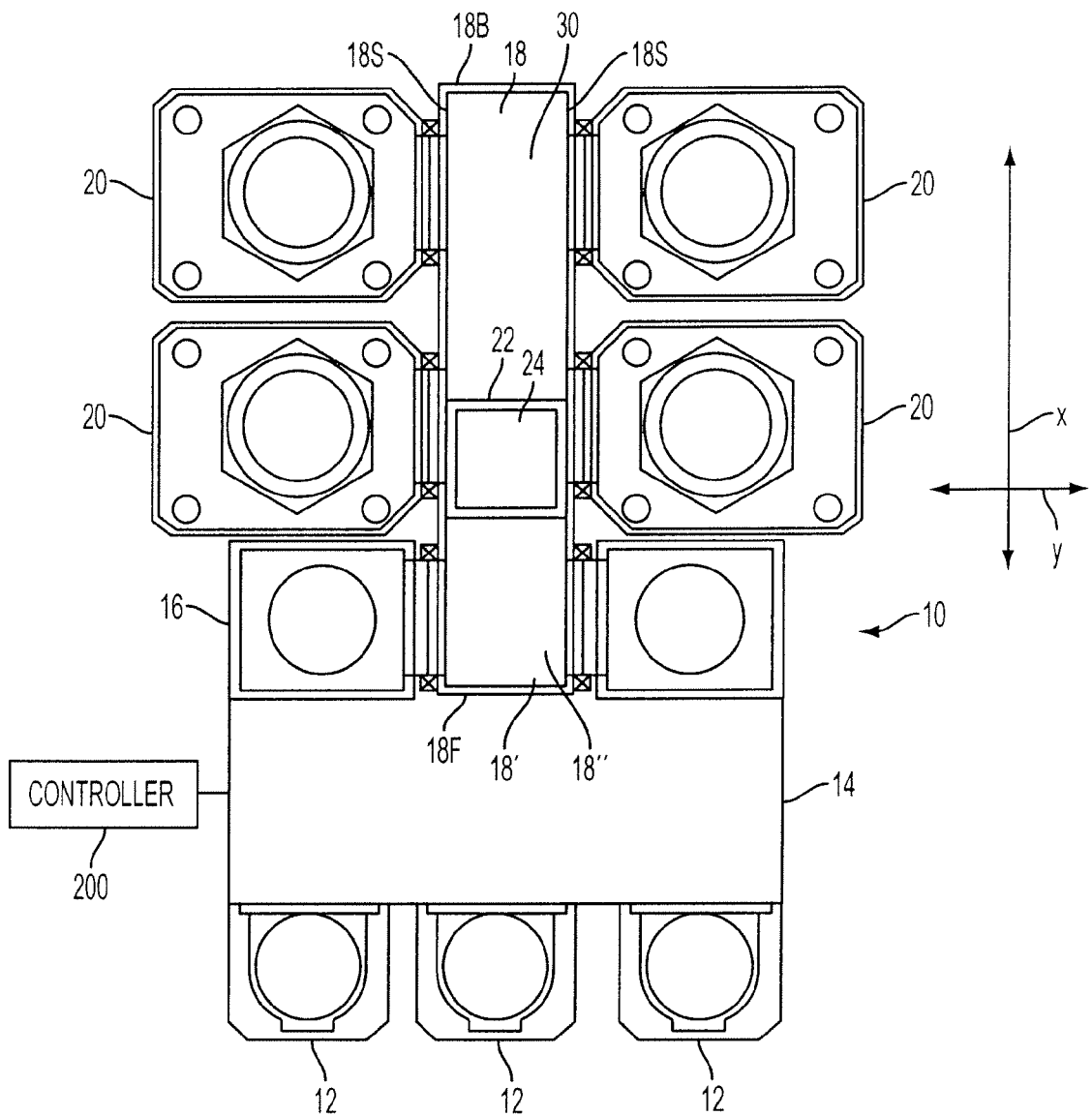
FIG. 2A is a schematic plan view of a substrate processing apparatus incorporating features of the disclosed embodiments.

FIG. 2A shows a schematic plan view of an exemplary substrate processing apparatus 10 suitable for practicing the embodiments disclosed herein. Although the presently disclosed embodiments are described with reference to substrate processing, it should be understood that the disclosed embodiments may have many alternate forms, including any system for magnetically transporting objects. In addition, any suitable size, shape or type of elements or materials could be used.

The disclosed embodiments relate to a propulsion and guidance system for a magnetically levitated material transport platform. Motor force equations and motor commutation equations, including expressions for calculation of motor control parameters based on specified propulsion and guidance forces, are provided for both two dimensional and three dimensional motor configurations.

The disclosed embodiments include adjusting an electrical angle used to drive a common set of commutation functions with an electrical angle offset so that the same motor commutation functions may be used for producing at least a one dimensional propulsion force in the x-direction, two dimensional forces including a propulsion force in the x-direction and a guidance force in the y-direction, and three dimensional forces including propulsion forces in both the x-direction and a z-direction and a guidance force in the y-direction.

In other words, by adjusting the electrical angle with the electrical angle offset, at least one, two, and three dimensional forces may be produced in the motor using a common set of commutation equations.

In particular, motor force equations, motor commutation equations, and motor control parameter calculations are provided for two dimensional motor configurations to produce propulsion in the x-direction by Lorentz forces, with guidance in the y-direction by Lorentz and Maxwell forces. Another embodiment includes motor force equations, motor commutation equations, and motor control parameter calculations to produce propulsion in the x-direction by Lorentz forces, with guidance in the y-direction by Maxwell forces for two dimensional motor configurations. Still another embodiment includes motor force equations, motor commutation equations, and motor control parameter calculations to produce propulsion in the x-direction with guidance in the y-direction primarily utilizing Lorentz forces for two dimensional motor configurations.

Similarly, for three dimensional motor configurations, motor force equations, motor commutation equations, and motor control parameter calculations are provided to produce propulsion in the x-direction, lift in the z-direction by Lorentz forces, with guidance in the y-direction by Lorentz and Maxwell forces. Additional embodiments include motor force equations, motor commutation equations, and motor control parameter calculations for three dimensional motor configurations to provide propulsion in the x-direction and lift in the z-direction by Lorentz forces, with guidance in y-direction by Maxwell forces. Yet another embodiment includes motor force equations, motor commutation equations, and motor control parameter calculations for three dimensional motor configurations that provide propulsion in the x-direction, lift in the z-direction, and guidance in the y-direction all utilizing Lorentz forces.

Further embodiments include motor force equations, motor commutation equations, and motor control parameter calculations for phase commutation with open loop stabilization, including open loop roll stabilization, open loop pitch stabilization with discrete forces, and open loop pitch stabilization with distributed forces.

Turning again to FIG. 2A, the substrate processing apparatus 10 may include a number of load ports 12, an environmental front end module (EFEM) 14, load locks 16, a transport chamber 18, one or more processing modules 20, and a controller 200.

The EFEM 14 may include a substrate transport apparatus (not shown) capable of transporting substrates from load ports 12 to load locks 16. The load ports 12 are capable of supporting a number of substrate storage canisters, for example conventional FOUP canisters or any other suitable substrate storage device. The EFEM 14 interfaces the transport chamber 18 through load locks 16. The EFEM 14 may further include substrate alignment capability, batch handling capability, substrate and carrier identification capability or otherwise. In alternate embodiments, the load locks 16 may interface directly with the load ports 12 as in the case where the load locks have batch handling capability or in the case where the load locks have the ability to transfer wafers directly from a FOUP to the lock. In alternate embodiments, other load port and load lock configurations may be provided.

Still referring to FIG. 2A, the processing apparatus 10 may be used for processing semiconductor substrates, for example, 200, 300, 450 mm wafers, flat panel displays, or any other suitable substrate. Each of the processing modules may be capable of processing one or more substrates, for example, by etching, plating, deposition, lithography, or any other substrate processing technique.

At least one substrate transport apparatus 22 is integrated with the transport chamber 18. In this embodiment, processing modules 20 are mounted on both sides of the transport chamber 18, however, in other embodiments processing modules 20 may be mounted on one side of the chamber, may be mounted opposite each other in rows or vertical planes, may be staggered from each other on the opposite sides of the transport chamber 18, or stacked in a vertical direction relative to each other.

The transport apparatus 22 generally includes a single carriage 24 positioned in the transport chamber 18 for transporting substrates between load locks 16 and processing modules 20 or among the processing chambers 20. In alternate embodiments, multiple carriages may be utilized in a transport apparatus. Moreover, the transport chamber 18 may be capable of being provided with any desired length and may couple to any desired number of processing modules 20. The transport chamber 18 may also be capable of supporting any desired number of transport apparatus 22 therein and allowing the transport apparatus 22 to reach any desired processing module 20 on the transport chamber 18 without interfering with each other.

The transport chamber 18 in this embodiment has a generally hexahedron shape though in alternate embodiments the chamber may have any other suitable shape. The transport chamber 18 has longitudinal side walls 18S with ports formed therethrough to allow substrates to pass into and out of the processing modules 20. The transport chamber 18 may contain different environmental conditions such as atmospheric, vacuum, ultra high vacuum, inert gas, or any other, throughout its length corresponding to the environments of the various processing modules connected to the transport chamber. While a single transport chamber 18 is shown, it should be understood that any number of transport chambers may be coupled together in any configuration to accommodate substrate processing. It should also be understood that the transport chamber may extend inside one or more of the processing modules 20, load locks 16, or even load ports 12, or one or more of the processing modules 20, load locks 16, or load ports 12 may have its own transport chamber coupled to transport chamber 18, allowing the transport mechanism to enter or otherwise deliver substrates to the processing modules.

The transport apparatus 22 may be integrated with the transport chamber 18 to translate the carriage 24 along an x-axis extending between the front of the chamber 18F and the back of the chamber 18B. The transport apparatus may also provide guidance along a y-axis perpendicular to the x-axis. In other embodiment, the transport apparatus 22 may translate the carriage along the x-axis and along a z-axis extending out from the surface of the page, orthogonal to the x and y axes, and provide guidance along the y-axis.

The carriage 24 may transport substrates by themselves, or may include other suitable mechanisms for substrate transport. For example, carriage 24 may include one or more end effectors for holding one or more substrates, an articulated arm, or a movable transfer mechanism for extending and retracting the end effectors for picking or releasing substrates in the processing modules or load locks. In some embodiments the carriage 24 may be supported by linear support or drive rails which may be mounted to the side walls 18S, which may include the floor or top of the transport chamber and may extend the length of the chamber, allowing the carriage 24 to traverse the length of the chamber.

The transport chamber 18 may have a number of transport zones 18', 18" which allow a number of transport apparatus to pass over each other, for example, a side rail, bypass rail or magnetically suspended zone. The transport zones may be located in areas defined by horizontal planes relative to the processing modules. Alternately, the transport zones may be located in areas defined by vertical planes relative to the processing modules.

Figure 2B:
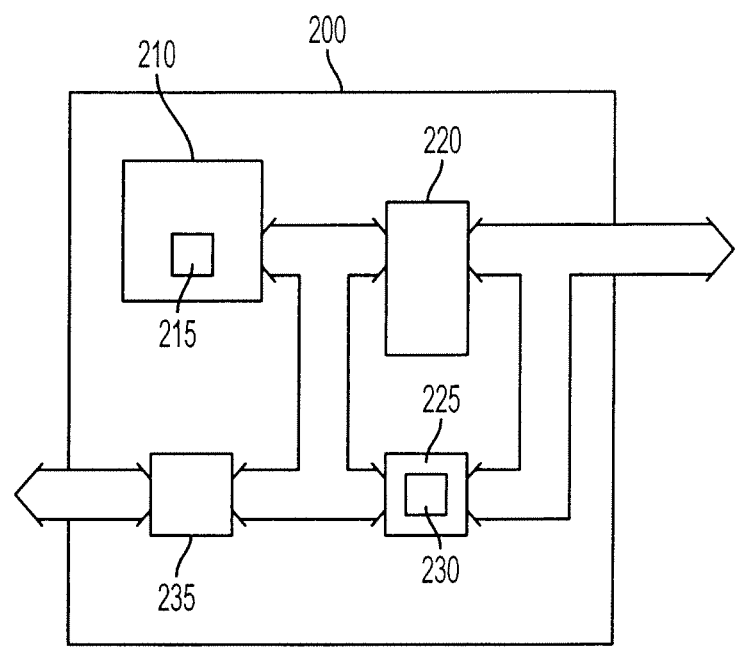
FIG. 2B is a schematic diagram of a controller of the substrate processing apparatus.

Turning to FIG. 2B, controller 200 may include a CPU 210 with at least one computer readable medium 215 having programs for controlling operations of controller 200. A multiplexer 220 and other drive electronics 225 including amplifiers 230 for driving windings as described below may also be utilized. The drive electronics 225 and the computer readable medium 215 may provide hardware and programs in any combination for implementing the functions and equations described below and for implementing the commutation functions according to the disclosed embodiments. It should be understood that circuitry in the context of the disclosed embodiments includes hardware, software or programs, or any combination of the two. An interface 235 may be included for receiving commands related to transport apparatus position or a force to be applied. Commands may be received from a user, from sensors associated with the transport apparatus, other controllers within the substrate processing apparatus, or from a control system controlling a number of substrate processing apparatus.

Controller 200 drives the windings as described below resulting in the application of various forces. Thus, controller 200 drives the windings to actively produce desirable combinations of propulsion, lift and guidance forces for open and closed-loop control.

The disclosed embodiments may employ one or more linear drive systems which may simultaneously drive and suspend the transport apparatus such that the transport apparatus may be horizontally and vertically independently movable. Thus, multiple transport apparatus may be capable of passing each other and capable of transporting substrates independent of each other. In some embodiments each transport apparatus may be driven by a dedicated linear drive motor. The disclosed embodiments may, in addition or alternately, employ one or more rotary drive systems which may simultaneously drive and suspend the transport apparatus such that the transport apparatus may be horizontally and vertically independently movable.

Figure 3:
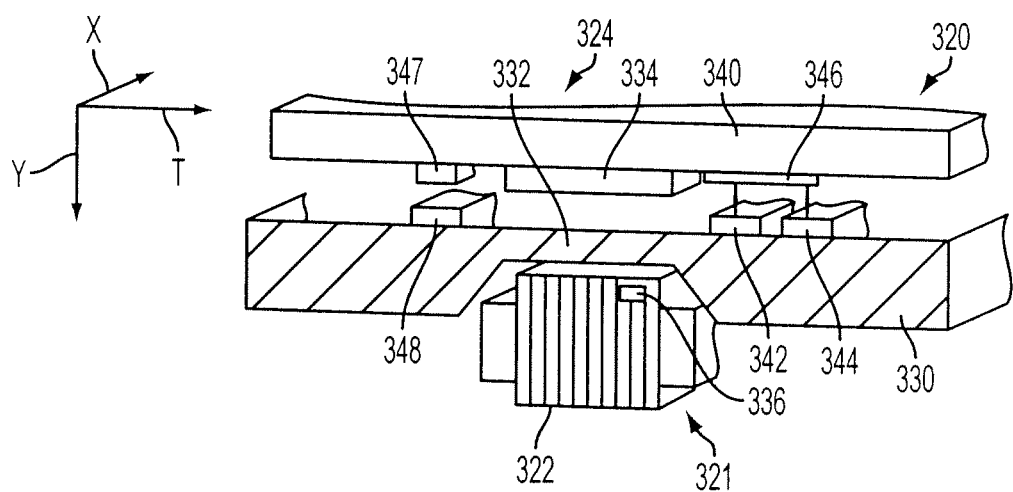
FIG. 3 is a schematic cross-sectional perspective view of a representative motor configuration suitable for practicing the disclosed embodiments.

FIG. 3 is a schematic cross-sectional perspective view of a motor configuration suitable for practicing the disclosed embodiments. The motor may be oriented as desired (the configuration shown may be as seen from a top view for example. In the exemplary embodiment shown in FIG. 3, there is schematically illustrated an exemplary linear propulsion and guidance system 320 in accordance with the disclosed embodiments, such as may be suitable for driving transport apparatus 22. Generally the linear propulsion and guidance system 320 may include a forcer with a winding set 322 which drives platen 324 (for example in the X-direction indicated by arrow X). In some embodiments, platen 324 may be supported in the z-direction by a suitable mechanism or structure (not shown). In this embodiment, winding set 322 may be mounted on the outside of or within a side wall 330 (which may include a top, side, or floor of the transport chamber 18) and is isolated from the chamber and from the platen 324 by the side wall 330 (a portion of which 332 may be interposed between forcer 322 and platen 324. In other embodiments, the windings of the motor may be located inside the transport chamber 18.

The platen 324 may include for example one or more magnets 334 for interfacing the platen 324 with winding set 322. As may be realized, in alternate embodiments, the permanent magnets may be located on the stator and the windings may be located on the driven platen. A sensor 336, for example, a magneto-resistive or hall effect sensor, may be provided for sensing the presence of the magnets in platen 324 and determining proper commutation. Additionally, sensors 336 may be employed for fine position determination of platen 324.

A position feedback device 340 may be provided for accurate position feedback. Device 340 may be inductive or optical for example. In the instance where it is inductive, an excitation source 342 may be provided which excites a winding or pattern 346 and inductively couples back to receiver 344 via coupling between the pattern 346. The relative phase and amplitude relationship may be used to determine the location of platen 324. An identification tag 347, such as an IR tag may be provided that may be read by reader 348, provided at an appropriate station to determine platen identification by station.

In other embodiments the winding set 322 may be mounted to the platen 324 while the one or more magnets 334 may be mounted on the outside of or within the side wall 330 (which may include a top, side, or floor of the transport chamber 18). The one or more magnets 334 may be isolated from the chamber and from the platen 324 by the side wall 330. In other embodiments, the one or more magnets 334 may be located inside the transport chamber 18.

Figure 4:
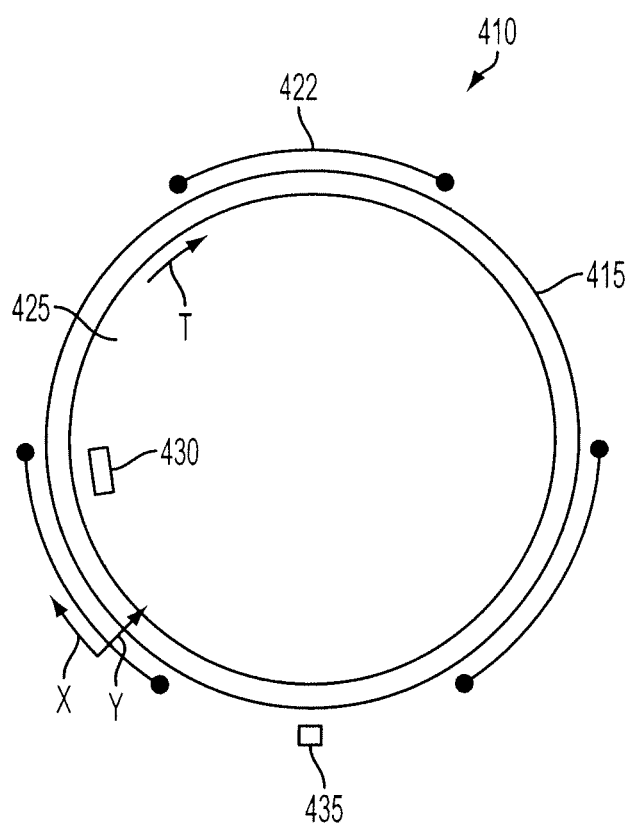
FIG. 4 shows another motor configuration suitable for practicing the disclosed embodiments.

FIG. 4 is a schematic view that shows another motor configuration in accordance with another exemplary embodiment. A top view of an exemplary rotary propulsion and guidance system 410 is shown in accordance with the disclosed embodiments, also suitable for driving transport apparatus 22. Rotary propulsion and guidance system 410 includes a stator 415 with a winding set 422 which drives a platen 425, in the form of a rotor, in the tangential direction (indicated by arrow T in FIG. 4). The stator and rotor illustrated in the exemplary embodiment may be considered to define for example a three-dimensional motor (T forces as well as X, Y forces) that comprises a number (three are shown for example purposes) of two-dimensional motor segments as will be described in greater detail below. The platen or rotor 425 may be supported in the z-direction (perpendicular to the plane of the page) by a suitable mechanism or structure. In this embodiment, the stator 415 may be mounted on the outside of or within a side wall 330 (FIG. 3) which may include a top, side, or floor of the transport chamber 18 and may be isolated from the chamber and from the platen or rotor 425 by the side wall 330. In other embodiments, the stator 415 may be located inside the transport chamber 18.

Magnets may be distributed on the platen 425 in any suitable configuration. As may be realized, in alternate embodiments the windings may be on the rotor and permanent magnets on the stator. The disclosed embodiments include at least two magnets 430 for interfacing the platen 425 with winding set 422. One or more sensors 435, for example, a magnetoresistive or hall effect sensor, may be provided for sensing the presence of the magnets 430 in platen 425 and determining proper commutation. Additionally, sensors 435 may be employed for fine position determination of platen 425.

In other embodiments the winding set 422 may be mounted to the platen 425 while the magnets 430 may be mounted to the stator 415. The one or more stator mounted magnets 430 may be isolated from the chamber and from the platen 425 by the side wall 330. In other embodiments, the magnets 430 may be located inside the transport chamber 18.

Figure 5:
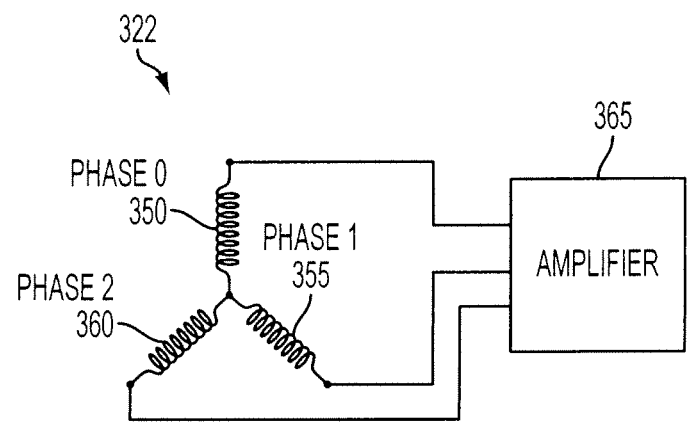
FIG. 5 shows a schematic of an exemplary wye configuration of a winding set.

FIG. 5 shows a schematic of an exemplary wye configuration of winding set 322, 422 (see FIGS. 3 and 4). Winding set 322, 422 may include for example three phases, phase 0 (350), phase 1 (355), and phase 2 (360) driven by amplifier circuitry 365.

Figure 6:
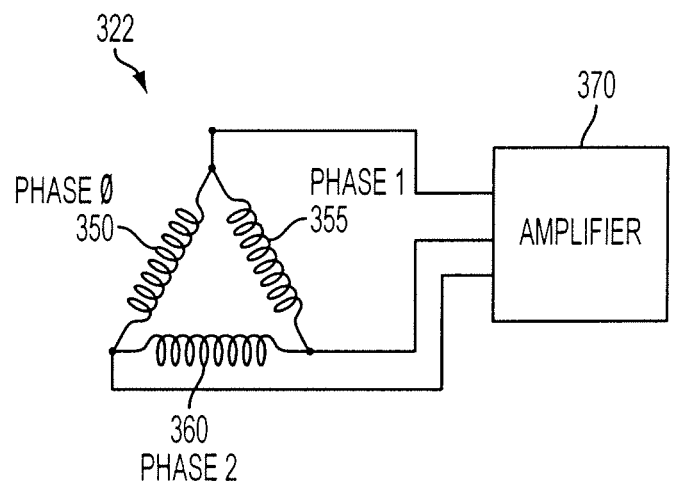
FIG. 6 shows a schematic of an exemplary delta configuration of a winding set.

FIG. 6 shows a schematic of an exemplary delta configuration of winding set 322, 422 that may include for example the three phases driven by amplifier circuitry 370.

Figure 7A:
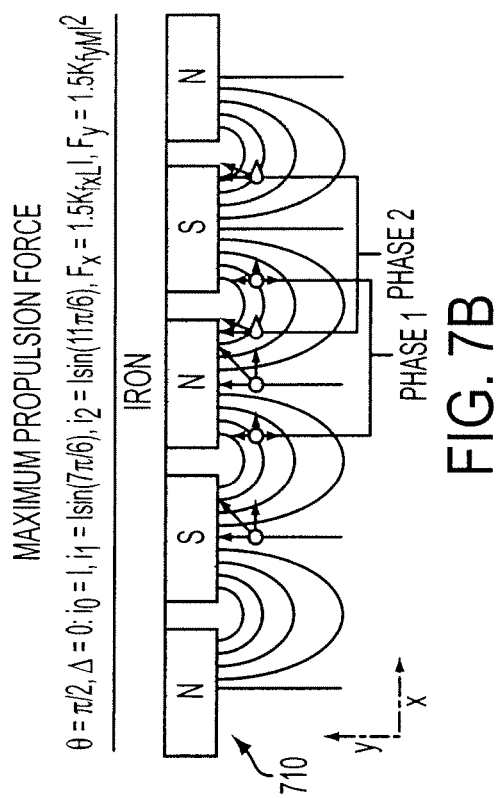
FIGS. 7A-7D show force vectors acting between a forcer and platen that provide propulsion in the x direction resulting from Lorentz forces, and guidance in the y direction resulting from Lorentz and Maxwell forces.
Figure 7B:
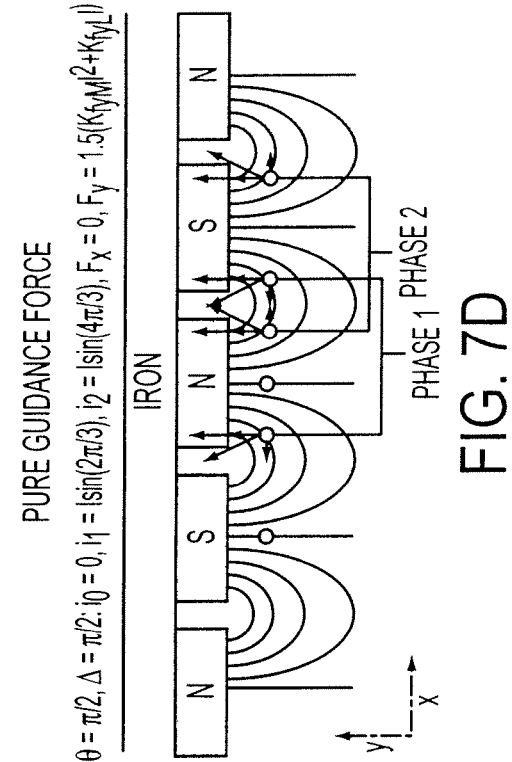
Figure 7C:
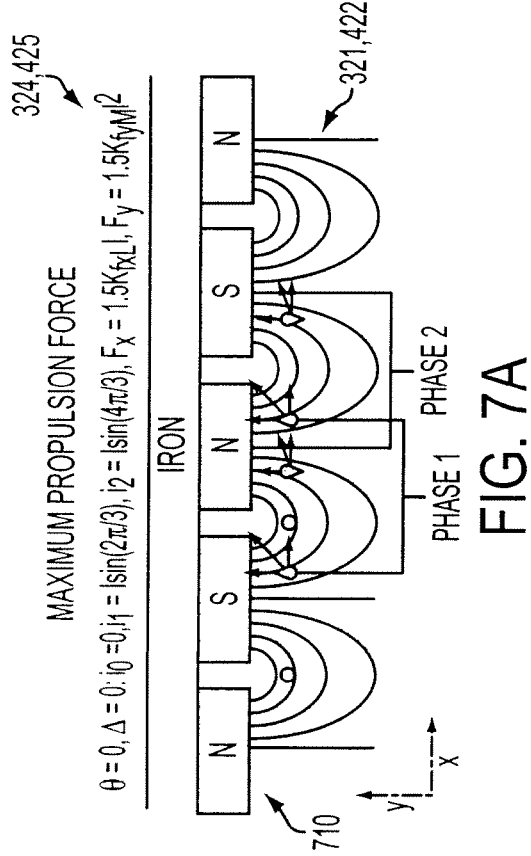
Figure 7D:
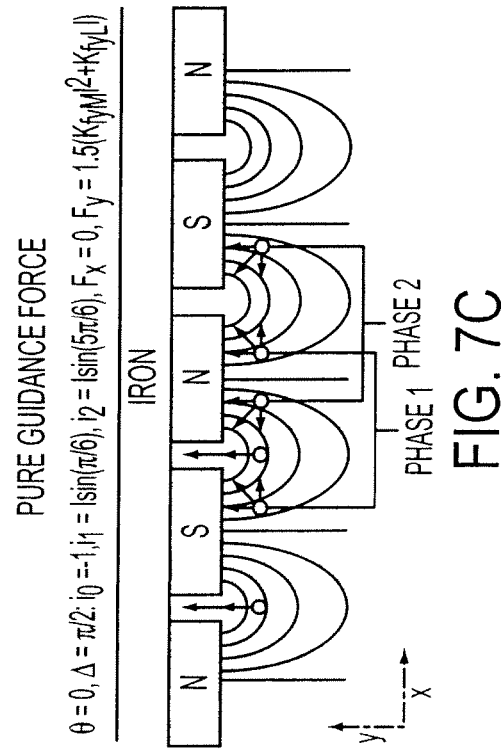

FIGS. 7A-7D show force vectors acting between forcer 321, 422 (see also FIGS. 3 and 4) and platen 324, 425 designated by arrows that provide propulsion in the x direction resulting in the exemplary embodiment from Lorentz forces, and guidance in the y direction resulting from Lorentz and Maxwell forces. While FIGS. 7A-7D are shown in the context of the linear propulsion device 320, the force vectors are also applicable to the rotary propulsion device 410. FIGS. 7A and 7B show force vectors acting between forcer 321, 422 and platen 324, 425 that essentially result in a propulsion force being applied in the x-direction with associated Maxwell component in the y-direction, while FIGS. 7C and 7D show force vectors acting on platen 324, 425 that specifically result in guidance forces being applied in the y direction for different operating characteristics. For the linear propulsion device 320, the applied forces provide control of the relative position of the platen 324 with respect to the forcer 321 in the x-direction as well as the gap between the platen 324 and the forcer 321 in the y-direction. For the rotary device 410, the applied forces provide control of the relative rotational position of the platen 425 in the tangential T direction (see FIG. 4, generally corresponding to the x-direction shown in FIG. 3), defined in this embodiment as a rotational direction in the plane of the x and y axes, and control of the gap between the platen 425 and the stator 415.

The platen 324, 425 of the embodiments of FIGS. 7A-7D may be composed of ferromagnetic materials. The one or more permanent magnets 334, 430 may include permanent magnets 710 of alternating polarity.

For this exemplary embodiment, the motor force equations, motor commutation equations, and expressions for calculation of motor control parameters based on specified propulsion and guidance forces are for example as follows:

Motor Force Equations:

$$F_x = \sum_{j=0}^{2} F_{xj} = K_{fx}(y) \sum_{j=0}^{2} i_j \sin[\theta(x) + (2\pi/3)j] \quad (1.1)$$

$$F_y = \sum_{j=0}^{2} F_{yj} = K_{fyM}(y) \sum_{j=0}^{2} i_j^2 - K_{fyL}(y) \sum_{j=0}^{2} i_j \cos[\theta(x) + (2\pi/3)j] \quad (1.2)$$

where:
$F_x$=Total force produced in x-direction (N)
$F_y$=Total force produced in y-direction (N)
$F_{xj}$=Force produced by phase j in x-direction, j=0, 1, 2 (N)
$F_{yj}$=Force produced by phase j in y-direction, j=0, 1, 2 (N)
$i_j$=Current through phase j, j=0, 1, 2 (N)
$K_{fx}$=Phase force constant in x-direction (N/A)
$K_{fyL}$=Lorentz phase force constant in y-direction (N/A)
$K_{fyM}$=Maxwell phase force constant in y-direction (N/A$^2$)
x=Position in x-direction (m)
y=Position in y-direction (m)
θ=Electrical angle (rad)

The motor commutation equation may be expressed for example as:

$$i_j = I \sin[\theta(x) - \Delta + (2\pi/3)j], j=0,1,2 \quad (1.3)$$

where I and Δ control the magnitude and orientation of the motor force vector and:
I=Amplitude of phase current (A)
Δ=Electrical angle offset (rad)

As may be realized from examination of (1.3), in the example the disclosed embodiments include adjusting the electrical angle θ using the electrical angle offset Δ so that a guidance force along the y-axis may be generated concurrently with, but controllable independently from, the propulsion force along the x-axis. Thus, by adjusting the electrical angle θ with the electrical angle offset Δ, the same motor commutation equation for producing a pure propulsion force may be used to produce both a propulsion force and a guidance force that are substantially independently controllable from each other.

Sinusoidal phase currents in accordance with Equation (1.3) can be generated using space vector modulation (SVM), such as for the wye winding configuration, to optimize utilization of bus voltage The resulting motor forces in the x and Y directions may be expressed for example as:

$$F_x = 1.5 I K_{fx}(y) \cos(\Delta) \quad (1.4)$$

$$F_y = 1.5I[K_{fyL}(y)\sin(\Delta) + IK_{fyM}(y)] \quad (1.5)$$

The substantially independent motor control parameters I and Δ in (1.4) and (1.5) may be derived for example as:

$$I = \frac{\sqrt{2}}{3} \frac{K_{fyL}}{K_{fyM}} \sqrt{\frac{9}{4} + 3\frac{K_{fyM}}{K_{fyL}} \frac{F_y}{K_{fyL}} + \sqrt{\delta}} \quad (1.22)$$

$$\Delta = \operatorname{atan}\left[\frac{\frac{F_y}{K_{fyL}} - 1.5I^2 \frac{K_{fyM}}{K_{fyL}}}{\frac{F_x}{K_{fx}}}\right] \quad (1.23)$$

where $$\delta = b^2 - 4ac \geq 0 \quad (1.18)$$

and $$a = \frac{9}{4}\left[\frac{K_{fyM}}{K_{fyL}}\right]^2 \quad (1.13)$$

$$b = -\frac{9}{4} - \frac{3F_y K_{fyM}}{K_{fyL}^2} \quad (1.14)$$

$$c = \left(\frac{F_x}{K_{fx}}\right)^2 + \left(\frac{F_y}{K_{fyL}}\right)^2 \quad (1.15)$$

For purposes of the disclosed embodiments, all arc tangent functions (a tan) described herein may also be interpreted as a four quadrant inverse tangent functions (a tan 2). [Please fix the language as needed.]

Inequality (1.18) imposes a constraint for the desired forces $F_x$ and $F_y$. This means, in order to have a solution I and Δ, such constraint is satisfied. Considering (1.13), (1.14) and (1.15), inequality (1.18) may be rewritten as:

$$\frac{F_y}{K_{fyL}} \geq \frac{2}{3} \frac{K_{fyM}}{K_{fyL}} \left(\frac{F_x}{K_{fx}}\right)^2 - \frac{3}{8} \frac{K_{fyL}}{K_{fyM}} \quad (1.19)$$

The constraint (1.19) means that, in the exemplary embodiment, given a desired force along x-direction, there may be a minimum physical limit for the force along y-direction.

The platen 324 and forcer 321 in the embodiments of FIGS. 7A-7D are generally held substantially parallel to each other, for example, utilizing any suitable structures, systems or techniques. FIGS. 7A-7D show the force vectors producing the propulsion component in the x-direction and the guidance component in the y-direction for different position dependent currents applied to the windings Phase 0, Phase 1, Phase 2.

As may be realized, the Maxwell force between the winding set 322, 422 and the ferromagnetic platen 324, 425 is attractive, hence an additional mechanism may be employed to produce a force in the opposite direction. This can be achieved, for example, by utilizing another winding set of the same type in a mirror configuration (not shown). In the exemplary embodiment there may be some coupling between the propulsion and guidance forces due to the constraint (1.19). For example, the current employed to produce some specified propulsion force may generate some guidance force. The additional winding set of similar type, disposed in a mirror configuration may also be used to balance the additional guidance force if desired, and thus resulting in substantially decoupled forces in the X-direction and Y-direction respectively for substantially any desired magnitude.

Figure 8:
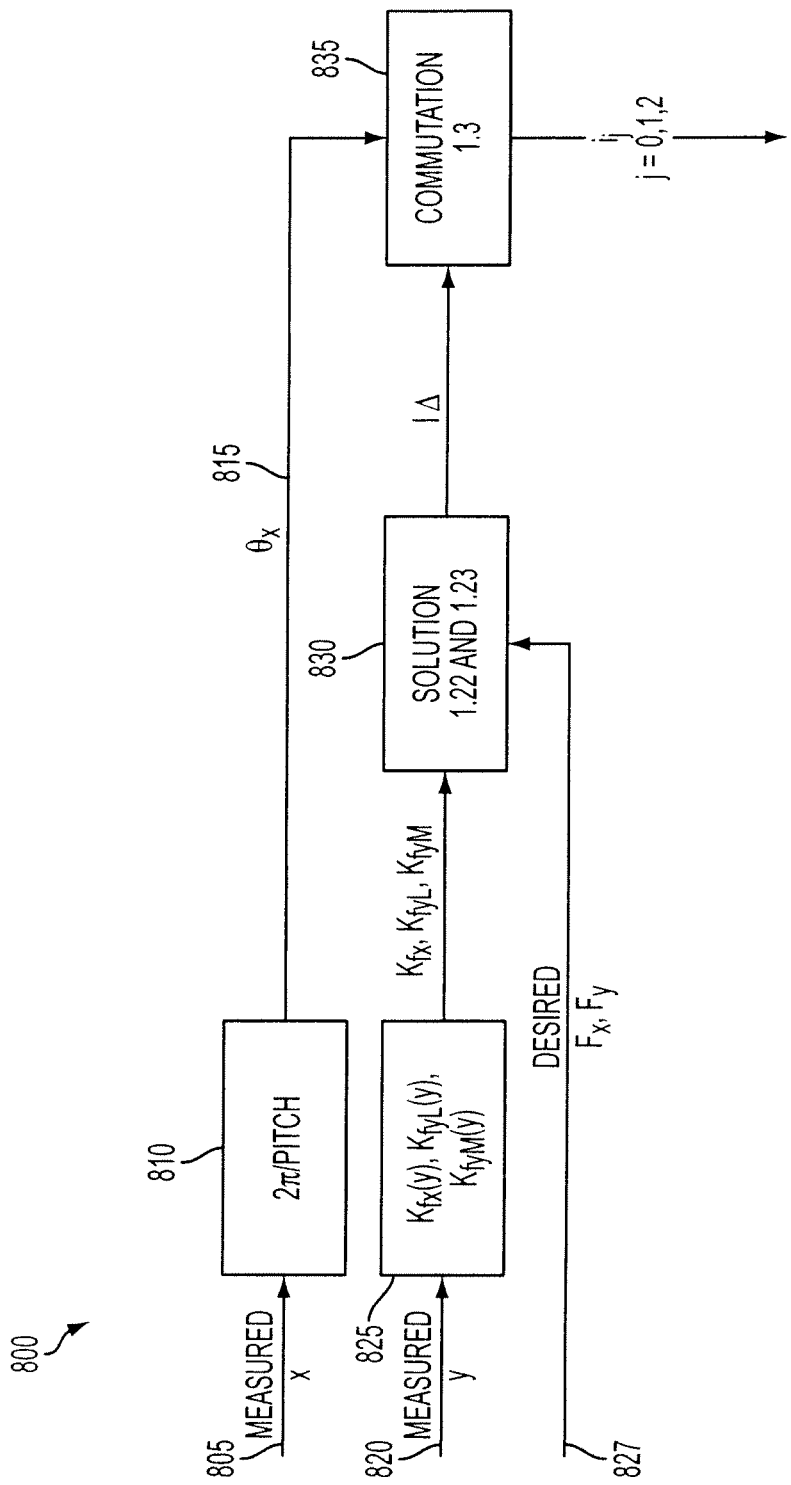
FIG. 8 shows a solution process for the embodiments of FIGS. 7A-7D.

FIG. 8 shows the solution process 800 for this two dimensional embodiment. The solution process 800 may be implemented in any combination of hardware or software. A measured x position coordinate 805 of the platen 324, 425 may be retrieved from position feedback device 340 (FIG. 3) and provided to electrical angle determination circuitry 810. Electrical angle determination circuitry or program 810 factors the measured x position coordinate 805 by 2π and a pitch of the winding set 322 (FIG. 3B) to determine electrical angle θ A measured y position coordinate 820 may be retrieved from position feedback device 340 (FIG. 3) and provided to a phase force constant determination block 825 where predetermined phase force constants for the x direction and for Lorentz and Maxwell forces in the y-direction are determined. The results and the desired forces in the x and y direction 827 are applied to control parameter circuitry or programs 830 that implement equations (1.22) and (1.23) to yield control parameters I and Δ. Electrical angle θ 815 and control parameters I and Δ are applied to commutation function 835 which implements equation (1.3) to provide commutation current i for each winding phase.

FIGS. 9A-9D show force vectors acting between forcer 321 (see also FIG. 3) and platen 324, designated by arrows that provide propulsion in the x direction utilizing Lorentz forces and guidance in the y direction utilizing Maxwell forces for different position dependent currents applied to the windings Phase 0, Phase 1, Phase 2. More specifically, FIGS. 9A and 9B show force vectors acting on platen 324, 425 that essentially result in a maximum propulsion force being applied, while FIGS. 9C and 9D show force vectors acting on platen 324, 425 that specifically result in guidance in the y direction. Similar to embodiments of FIGS. 7A-7D, the platen 324, 435 of the embodiments of FIGS. 9A-9D may be composed of ferromagnetic materials, the permanent magnets 334, 430 may include permanent magnets 910 of alternating polarity and the winding set 322, 422 may have three phases.

In this embodiment a force vector is produced in the x-y plane, including a propulsion component in the x-direction and a guidance component in the y-direction. In the linear propulsion embodiment 320 this enables control of the relative position of the ferromagnetic platen 324 with respect to the forcer 321 in the x-direction as well as the gap between the platen 324 and the forcer 321 in the y-direction. In the rotary propulsion embodiment 410, the applied forces provide control of the relative rotational position of the platen 425 in the x-direction, defined in this embodiment as a rotational direction in the plane of the x and y axes, and control of the gap between the platen 425 and the stator 415.

As mentioned above, in the linear propulsion embodiment 320 platen 324 may be supported in the z-direction by a suitable mechanism or structure. In the rotary propulsion embodiment 410, the platen or rotor 425 may be supported in the z-direction (perpendicular to the plane of the page) by a suitable mechanism or structure.

The embodiments of FIGS. 9A-9D utilize Lorentz forces for propulsion and Maxwell forces for guidance. It may be assumed that the Lorentz component along the y-direction may be negligible compared to the Maxwell component. As mentioned above, because the Maxwell force between the windings and the ferromagnetic platen is attractive, an additional mechanism (not shown) may be used to produce a force in the opposite direction. This can be achieved, for example, by utilizing another winding set of similar type in a mirror configuration. As noted before, decoupling between the propulsion and guidance forces to produce any desired propulsion force, may be effected as desired with the additional winding set of similar type disposed in a mirror configuration.

The motor force equations for the embodiments of FIGS. 9A-9D may be expressed for example as:

$$F_x = \sum_{j=0}^{2} F_{xj} = K_{fx}(y) \sum_{j=0}^{2} i_j \sin[\theta(x) + (2\pi/3)j] \quad (2.1)$$

$$F_y = \sum_{j=0}^{2} F_{yj} = K_{fy}(y) \sum_{j=0}^{2} i_j^2 \quad (2.2)$$

where
$F_x$=Total force produced in x-direction (N)
$F_y$=Total force produced in y-direction (N)
$F_{xj}$=Force produced by phase j in x-direction, j=0, 1, 2 (N)
$F_{yj}$=Force produced by phase j in y-direction, j=0, 1, 2 (N)
$i_j$=Current through phase j, j=0, 1, 2 (N)
$K_{fx}$=Phase force constant in x-direction (N/A)
$K_{fy}$=Phase force constant in y-direction (N/A$^2$)
x=Position in x-direction (m)
y=Position in y-direction (m)
θ=Electrical angle (rad)

The motor commutation equation may be for example:

$$i_j = I \sin[\theta(x) - \Delta + (2\pi/3)j], j=0,1,2 \quad (2.3)$$

where I and Δ are control parameters and:
I=Amplitude of phase current (A)
Δ=Electrical angle offset (rad)

It should be noted that equation (2.3) is the same as (1.3) and that adjusting the electrical angle θ using the electrical angle offset Δ produces a guidance force along the y-axis and a propulsion force along the x-axis. Thus, by adjusting the electrical angle θ with the electrical angle offset Δ, the same motor commutation equation for producing a pure propulsion force may be used to produce both a propulsion force and a guidance force that may be substantially decoupled from each other as previously described.

With the winding set 322 in a wye-configuration, sinusoidal phase currents in accordance with Equation (2.3) may be generated using space vector modulation. The resulting motor forces are:

$$F_x = 1.5 I K_{fx}(y) \cos(\Delta) \quad (2.4)$$

$$F_y = 1.5 I^2 K_{fy}(y) \quad (2.5)$$

and motor force coupling of the propulsion and guidance forces may be represented as:

$$F_y = \frac{K_{fy}(y)}{1.5} \left( \frac{F_x}{K_{fx}(y)\cos(\Delta)} \right)^2 \quad (2.6)$$

$$F_y \geq \frac{K_{fy}(y)}{1.5} \left[ \left( \frac{F_x}{K_{fx}(y)} \right)^2 \right] \quad (2.7)$$

The independent control parameters I and Δ for particular forces in the x and y directions may be derived as:

$$I = \sqrt{F_y/[1.5 K_{fy}(y)]} \quad (2.8)$$

$$\Delta = a\cos\{F_x/[1.5 I K_{fx}(y)]\} \quad (2.9)$$

FIG. 9A shows exemplary vectors 915, 920, 925, 930 that result in a force along the x-axis from driving the phases with an electrical angle (θ) of 0, an electrical angle offset (Δ) of 0, a current through phase 0 of 0, a current through phase 1 of I sin(2π/3), and a current through phase 2 of I sin(4π/3), where the total force produced in the x-direction ($F_x$) is 1.5I$K_{fx}$, and the total amount of force in the y-direction ($F_y$) is 1.5I$^2 K_{fy}$.

FIG. 9B shows exemplary vectors 932, 934, 936, 938, 940, 942 that result in a force along the x-axis from driving the phases with an electrical angle (θ) of π/2, an electrical angle offset (Δ) of 0, a current through phase 0 of I, a current through phase 1 of I sin(7π/6), and a current through phase 2 of I sin(11π/6), where the total force produced in the x-direction ($F_x$) is 1.5I$K_{fx}$, and the total amount of force in the y-direction ($F_y$) is 1.5I$^2 K_{fy}$.

FIG. 9C shows exemplary vectors 944, 946, 948, 950, 952, 954 that result in a force along the y-axis from driving the phases with an electrical angle (θ) of 0, an electrical angle offset (Δ) of π/2, a current through phase 0 of −I, a current through phase 1 of I sin(π/6) and a current through phase 2 of I sin(5π/6) I sin(π/6), where the total force produced in the x-direction ($F_x$) is 0, and the total amount of force in the y-direction ($F_y$) is 1.5I$^2 K_{fy}$.

FIG. 9D shows exemplary vectors 956, 958, 960, 962 that result in a force along the y-axis from driving the phases with an electrical angle (θ) of π/2, an electrical angle offset (Δ) of π/2, a current through phase 0 of 0, a current through phase 1 of I sin(2π/3) and a current through phase 2 of I sin(4π/3), where the total force produced in the x-direction ($F_x$) is 0, and the total amount of force in the y-direction ($F_y$) is 1.5I$^2 K_{fy}$.

Figure 10:
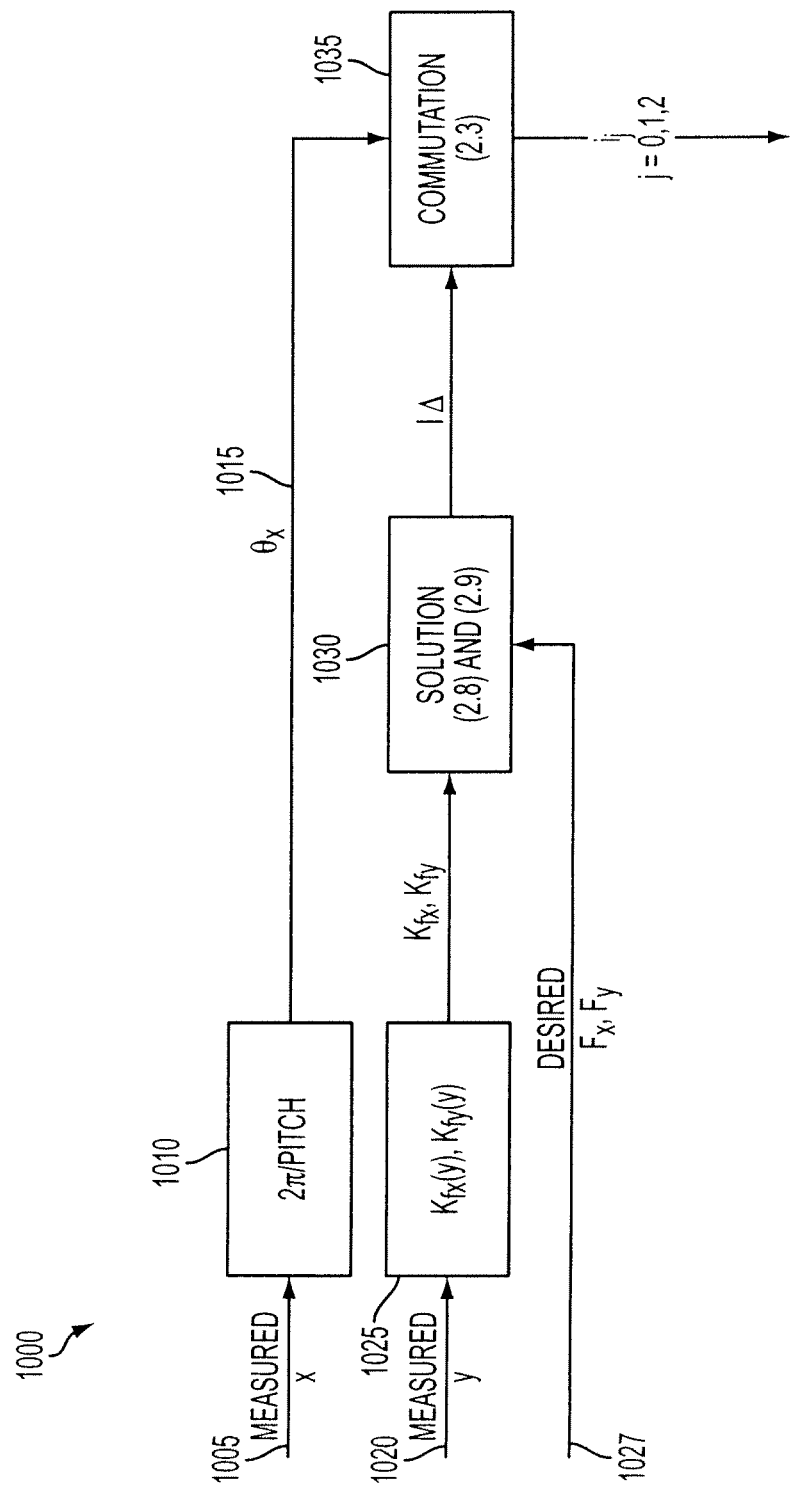
FIG. 10 shows a solution process for the embodiments of FIGS. 9A-9D.

FIG. 10 shows a diagram of an exemplary solution process 1000 for performing commutation to produce the propulsion component in the x-direction with Lorentz forces and the guidance component in the y-direction with Maxwell forces as described above. The solution process 1000 may be implemented in any combination of hardware or software. A measured x position coordinate 1005 of the platen 324, 425 may be retrieved from position feedback device 340 (FIG. 3) and provided to electrical angle determination circuitry or program 1010. Electrical angle determination circuitry or program 1010 factors the measured x position coordinate 1005 by 2π and a pitch of the winding set 322 (FIG. 3B) to determine electrical angle θ 1015. A measured y position coordinate 1020 may be retrieved from position feedback device 340 (FIG. 3) and provided to a phase force constant determination block 1025 where predetermined phase force constants for the x and y directions are obtained. The results and the desired forces in the x and y direction 1027 are applied to control parameter circuitry or programs 1030 that implement equations (2.8) and (2.9) to yield control parameters I and Δ. Electrical angle θ 1215 and control parameters I and Δ are applied to commutation function 1035 which implements equation (2.3) to provide commutation current i for each winding phase.

Figure 11A:
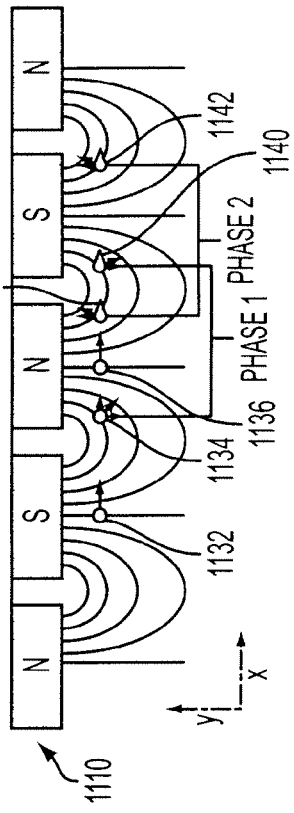
FIGS. 11A-11D show force vectors acting on a platen that provide propulsion in the x direction and guidance in the y direction resulting from Lorentz forces.
Figure 11B:
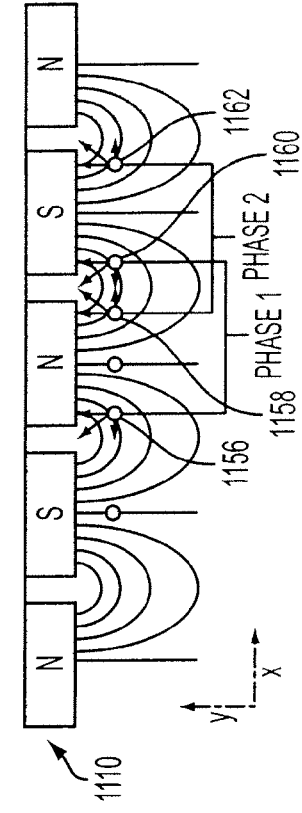
Figure 11C:
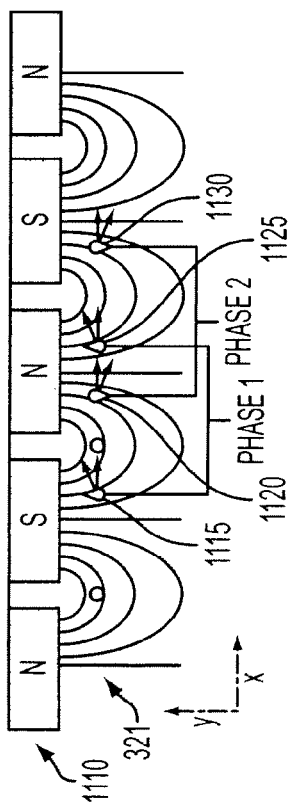
Figure 11D:
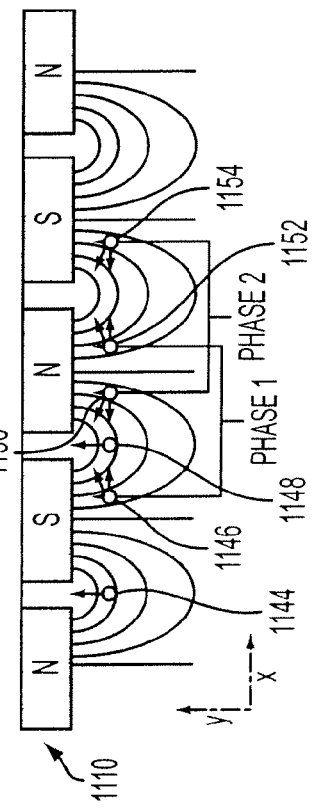

FIGS. 11A-11D are other schematic cross sectional views of a representative motor showing force vectors acting between forcer 321 (see FIG. 3) and platen 324, designated by arrows, that result in propulsion in the x-direction with guidance in the y-direction utilizing Lorentz forces. More specifically, in accordance with another exemplary embodiment FIGS. 11A and 11B show force vectors acting between forcer 321, 422 and platen 324, 425 that primarily result in propulsion in the x-direction, while FIGS. 11C and 11D show force vectors acting between forcer 321, 422 and platen 324, 425 that specifically result in guidance in the y-direction. In the embodiments of FIGS. 11A-11D, platen 324, 425 (see FIGS. 3-4) may be composed of a non-ferromagnetic material and the permanent magnets 334, 430 may include permanent magnets 1110 of alternating polarity. In the linear propulsion embodiment 320 the forcer 321 may also be composed of a non-ferromagnetic material. In the rotary propulsion embodiment 410, the stator 415 may be composed of a non-ferromagnetic material.

FIGS. 11A-11D show different force diagrams for different driving characteristics used to energize phases 0, 1, and 2. The embodiments produce a force vector in the x-y plane, including a propulsion component in the x-direction and a guidance component in the y-direction.

In the linear propulsion embodiment 320 the relative position of the platen 324 with respect to the forcer 321 in the x-direction as well as the gap between the platen 324 and the forcer 321 in the y-direction are controlled in an independent manner. As mentioned above, the platen 324 and forcer 321 may be controlled to remain substantially parallel to each other, for example, utilizing any suitable mechanism. Similarly, in the rotary propulsion embodiment 410, the applied forces provide control of the relative rotational position of the platen 425 in the x-direction, defined in this embodiment as a rotational (e.g. tangential) direction in the plane of the x and y axes, and control of the gap between the platen 425 and the forcer 422. As may be realized, the gap with respect to the whole stator is a two-dimensional quantity (vector), whereas the gap with respect to an individual forcer segment is a scalar that can be controlled by the given forcer segment (although the other forcers are also contributing. The platen or rotor 425 may be supported in the z-direction (perpendicular to the plane of the page) by a suitable mechanism or structure.

The embodiments utilize Lorentz forces produced by applying position-dependent currents to the windings subject to the magnetic field of the permanent magnets.

The following motor force equations may be utilized:

$$F_x = \sum_{j=0}^{2} F_{xj} = K_{fx}(y)\sum_{j=0}^{2} i_j \sin[\theta(x) + (2\pi/3)j] \quad (3.1)$$

$$F_y = \sum_{j=0}^{2} F_{yj} = -K_{fy}(y)\sum_{j=0}^{2} i_j \cos[\theta(x) + (2\pi/3)j] \quad (3.2)$$

where
$F_x$=Total force produced in x-direction (N)
$F_y$=Total force produced in y-direction (N)
$F_{xj}$=Force produced by phase j in x-direction, j=0, 1, 2 (N)
$F_{yj}$=Force produced by phase j in y-direction, j=0, 1, 2 (N)
$i_j$=Current through phase j, j=0, 1, 2 (N)
$K_{fx}$=Phase force constant in x-direction (N/A)
$K_{fy}$=Phase force constant in y-direction (N/A)
x=Position in x-direction (m)
y=Position in y-direction (m)
θ=Electrical angle (rad)

In the exemplary embodiment, motor commutation equation may before example:

$$i_j = I \sin[\theta(x) - \Delta + (2\pi/3)j], j=0,1,2 \quad (3.3)$$

where I and Δ control the magnitude and orientation of the motor force vector, respectively. More specifically:
I=Amplitude of phase current (A); and
Δ=Electrical angle offset (rad)

It should be noted that equations (3.3), (2.3), and (1.3) are the same. Thus, similar to the embodiments above, adjusting the electrical angle θ using the electrical angle offset Δ produces a guidance force along the y-axis and a propulsion force along the x-axis. Thus, by adjusting the electrical angle θ with the electrical angle offset Δ, the same motor commutation equation for producing a pure propulsion force may be used to produce both a propulsion force and a guidance force that are substantially decoupled from each other.

With the winding set 322, 422 in a wye configuration, sinusoidal phase currents in accordance with Equation (3.3) can be generated using space vector modulation.

The following motor forces are the result:

$$F_x = 1.5 I K_{fx}(y)\cos(\Delta) \quad (3.4)$$

$$F_y = 1.5 I K_{fy}(y)\sin(\Delta) \quad (3.5)$$

and the values of the independent control parameters I and Δ may be derived from:

$$I = \sqrt{[F_x/K_{fx}(y)]^2 + [F_y/K_{fy}(y)]^2}/1.5 \quad (3.6)$$

$$\Delta = a\tan[F_y K_{fx}(y), F_x K_{fy}(y)] \quad (3.7)$$

FIG. 11A shows exemplary vectors 1115, 1120, 1125, 1130 that result in a force along the x-axis from driving the phases with an electrical angle (θ) of 0, an electrical angle offset (Δ) of 0, a current through phase 0 of 0, a current through phase 1 of I sin(2π/3), and a current through phase 2 of I sin(4π/3), where the total force produced in the x-direction ($F_x$) is 1.5I$K_{fx}$, and the total amount of force in the y-direction ($F_y$) is 0.

FIG. 11B shows exemplary vectors 1132, 1134, 1136, 1138, 1140, 1142 that result in a force along the x-axis from driving the phases with an electrical angle (θ) of π/2, an electrical angle offset (Δ) of 0, a current through phase 0 of I, a current through phase 1 of I sin(7π/6), and a current through phase 2 of I sin(11π/6), where the total force produced in the x-direction ($F_x$) is 1.5I$K_{fx}$, and the total amount of force in the y-direction ($F_y$) is 0.

FIG. 11C shows exemplary vectors 1144, 1146, 1148, 1150, 1152, 1154 that result in a force along the y-axis from driving the phases with an electrical angle (θ) of 0, an electrical angle offset (π) of π/2, a current through phase 0 of –I, a current through phase 1 of I sin(7π/6), and a current through phase 2 of I sin(5π/6), where the total force produced in the x-direction ($F_x$) is 0, and the total amount of force in the y-direction ($F_y$) is 1.5I$K_{fy}$.

FIG. 11D shows exemplary vectors 1156, 1158, 1160, 1162 that result in a force along the y-axis from driving the phases with an electrical angle (θ) of π/2, an electrical angle offset (Δ) of π/2, a current through phase 0 of 0, a current through phase 1 of I sin(2π/3), and a current through phase 2 of I sin(4π/3), where the total force produced in the x-direction ($F_x$) is 0, and the total amount of force in the y-direction ($F_y$) is 1.5I$K_{fy}$. In alternate embodiments, generally to that shown in FIGS. 11A-11D, ferromagnetic materials may be avoided to eliminate Maxwell-type force affects.

Figure 12:
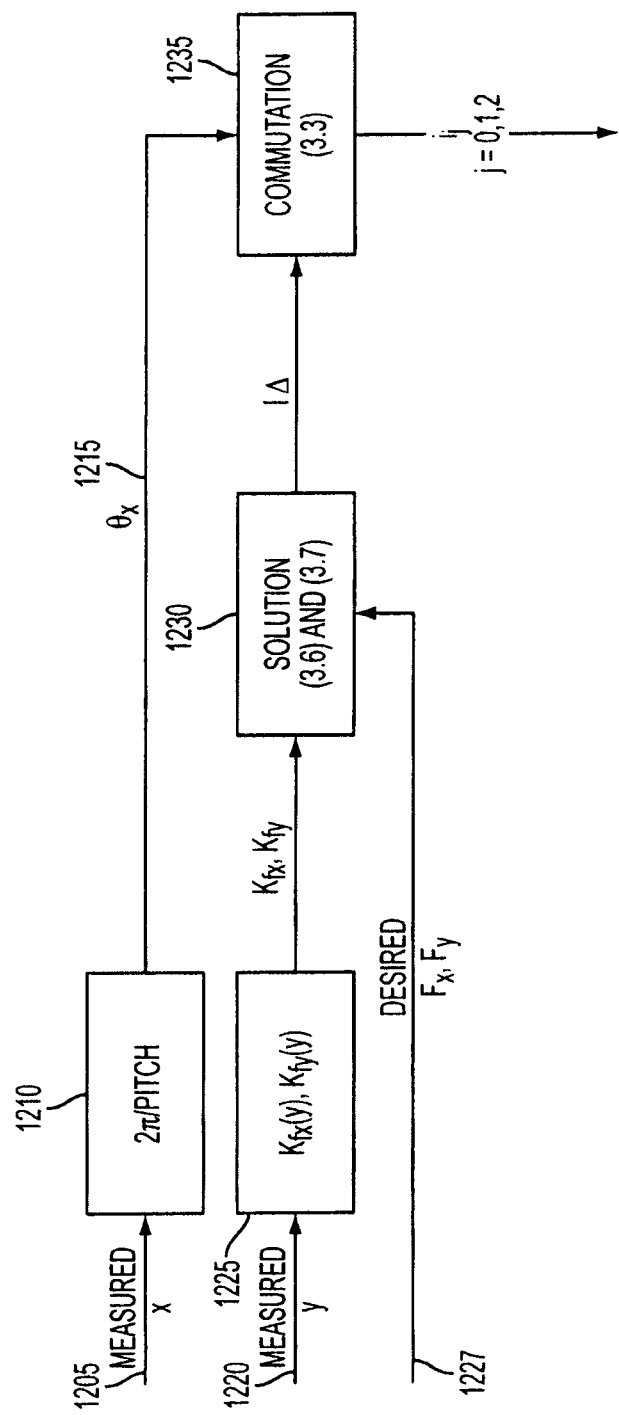
FIG. 12 shows a solution process for the embodiments of FIGS. 11A-11D.

FIG. 12 shows a diagram of a solution process 1200 for performing commutation to produce propulsion and guidance components as described above. The solution process 1200 may be implemented in any combination of hardware or software. A measured x position coordinate 1205 of the platen 324, 425 may be retrieved from position feedback device 340 (FIG. 3) and provided to electrical angle determination circuitry 1210. Electrical angle determination circuitry 1210 factors the measured x position coordinate 1205 by 2π and a pitch of the winding set 322 (FIG. 3B) to determine electrical angle θ 1215. A measured y position coordinate 1220 may be retrieved from position feedback device 340 (FIG. 3) and provided to a phase force constant determination block 1225 where predetermined phase force constants for the x and y directions are obtained. The results and desired forces in the x and y direction 1227 are applied to control parameter circuitry or programs 1230 that implement equations (3.6) and (3.7) to yield control parameters I and Δ. Electrical angle θ 1215 and control parameters I and Δ are applied to commutation function 1235 which implements equation (3.3) to provide commutation current i for each winding phase.

Referring now to FIGS. 20A-20D, there is shown schematic cross-sectional views of a motor in accordance with another exemplary embodiment, illustrating force vectors, acting between forcer 321' and platen 324', for different reactant force conditions (e.g. maximum propulsion FIGS. 20A-20B and maximum guidance FIGS. 20C-20D) and different electrical positions between forcer and platen (e.g. θ=0, θ=π/2). The motor configuration in the exemplary embodiment shown in FIGS. 20A-20D, may be generally similar to that shown in FIGS. 3, 4 and 7, 9 and 11A-11D and described before (and similar features are similarly numbered). In the exemplary embodiment, the magnet array 2010 on the platen may be, for example, mounted on ferromagnetic backing material, and hence the motor may employ both Lorentz and Maxwell forces. In alternate embodiments, the magnet array may be disposed without magnetic material backing. In the exemplary embodiment shown, the winding arrangement of forcer 321' may have the phase (e.g. phase 1, phase 2, phase 3) spaced for example at about π/3 electrical intervals. As may be realized, the commutation equation (in the exemplary embodiment having the general form:

$$i = I \sin[\theta(x) - \Delta + (\pi/3)ij], i=0,1,2$$

may be utilized in a manner similar to that described previously (see for example (1.1)-(1.23)) in order to generate similar force vectors as in the exemplary embodiments shown in FIGS. 7A-7D, 9A-9D, and 11A-11D and previously described. In alternate embodiments, the winding phases may be arranged in any other suitable electrical intervals.

Figure 13A:
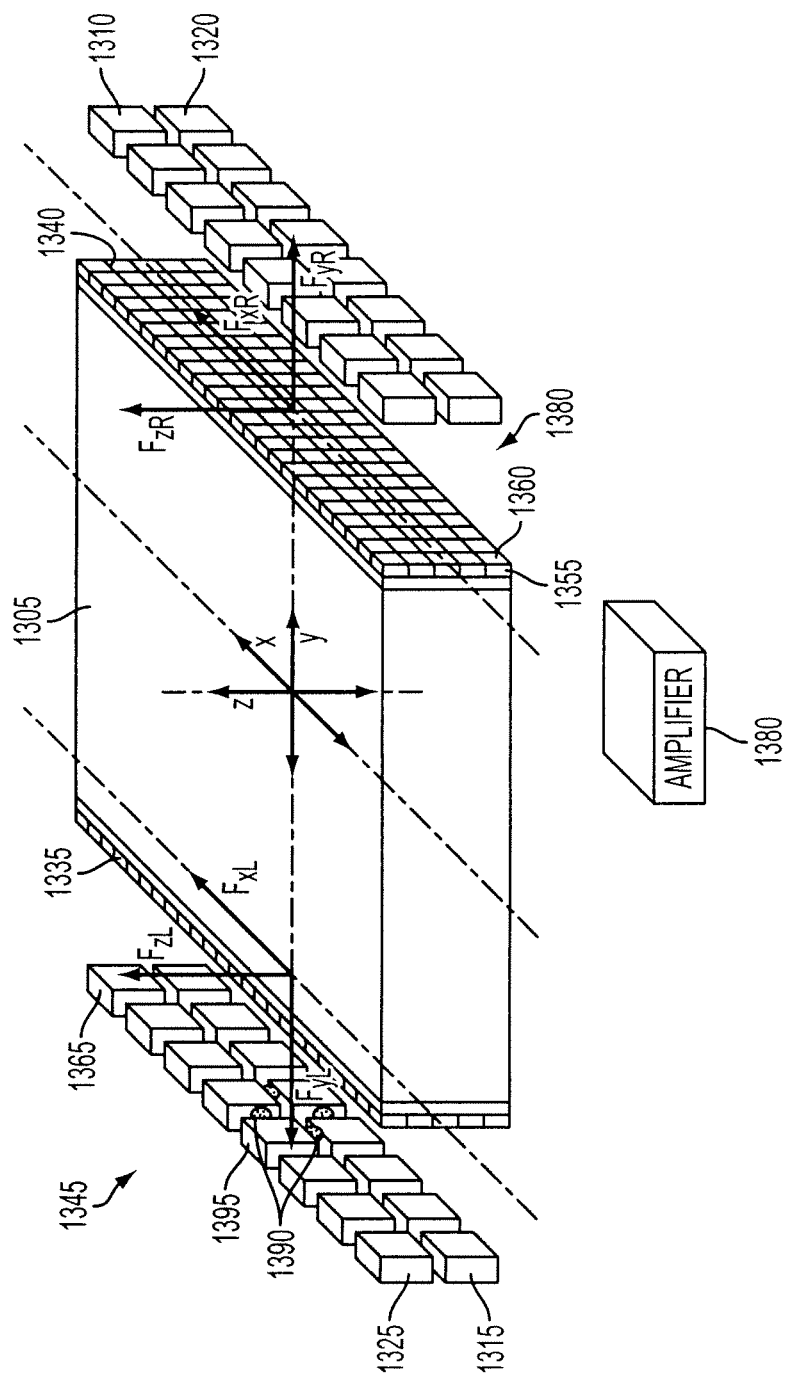
FIG. 13A is a schematic perspective view of a linear propulsion system with motor(s) having a configuration in accordance with another exemplary embodiment

FIG. 13A is a schematic perspective view of a linear propulsion system having a number of three dimensional motors (two three-dimensional motors are shown for example purposes). An exemplary linear propulsion system is shown that provides propulsion along the x-axis using Lorentz forces, lift along the z-axis using Lorentz forces, and guidance along the y-axis using Lorentz and Maxwell forces. It should be understood that the rotary motor embodiment of FIG. 4 may also be adapted for three dimensional applications.

The embodiment in FIG. 13A includes winding sets 1310, 1320 positioned on one side of a transport apparatus 1305, and winding sets 1315, 1325 positioned on an opposing side of transport apparatus 1305. The winding sets 1310, 1315, 1320, 1325 are driven by amplifier 1330. Amplifier 1330 may be a multi-channel amplifier capable of driving each of the individual windings 1365 of winding sets 1310, 1315, 1320, 1325 separately or in groups. Winding sets 1310 and 1325 may have the same orientation and may be oriented 90 degrees from winding sets 1315 and 1320.

The transport apparatus 1305 includes magnet platens 1335, 1340. Magnet platens 1335, 1340 may be arranged as an array of magnets and may extend along a length of opposing sides 1345, 1350, respectively, of transport apparatus 1305. In one embodiment, the array of magnets may be arranged with alternating north poles 1355 and south poles 1360 facing the winding sets. A position feedback system, for example, a suitable number of position sensors (e.g. Hall effect sensors 1390, 1395 may be provided for sensing the location, for example, the x, y, and z coordinates of the transport apparatus 1305. Other suitable sensor systems may be utilized.

Figure 1:
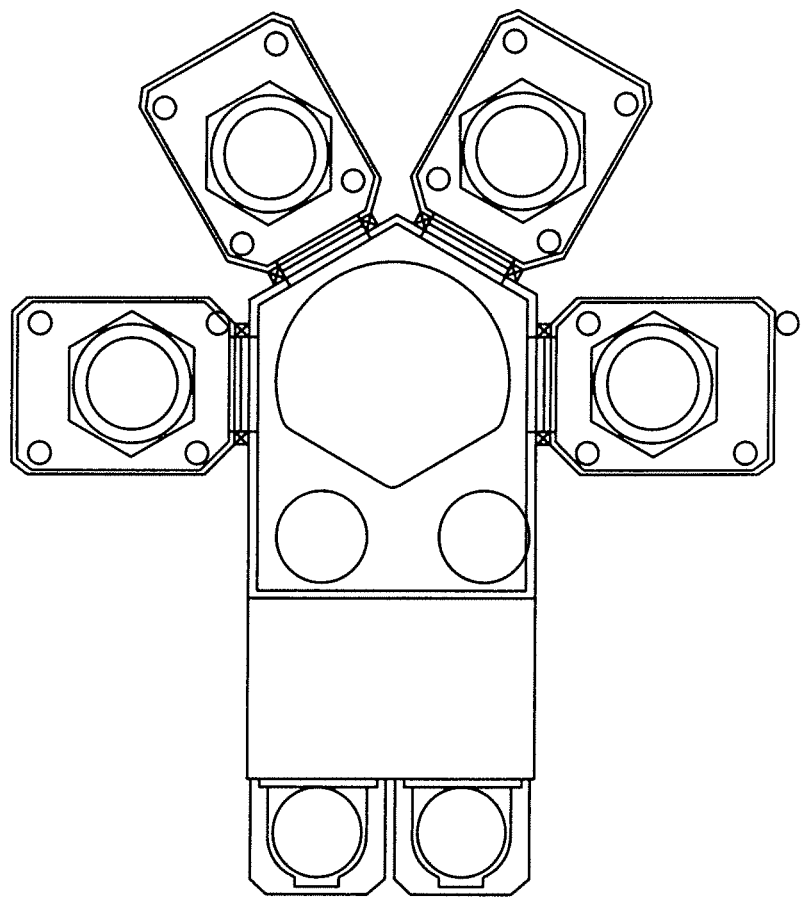
FIG. 1 is a schematic plan view of a prior art substrate processing apparatus.

FIGS. 13B1-13B2 show respectively different exemplary arrangements 1370, 1370' of the array of magnets that may be used with the disclosed embodiments. In the exemplary embodiment shown in FIG. 13B1, the rows of magnets may be staggered or offset with alternating rows having the N and S polarities facing outward. In the exemplary embodiment shown in FIG. 13B2, the magnets may be arrayed in alternating polarities along rows that may be angled as desired relative to the X-direction. Other magnet arrangements may also be used.

Figure 13C:
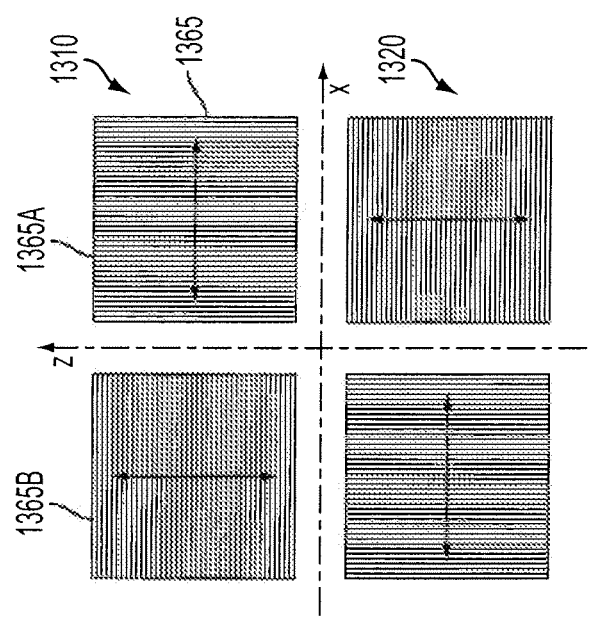
FIG. 13C shows an alternate arrangement of individual windings for use with the disclosed embodiments.

FIG. 13C shows an exemplary arrangement of the individual windings 1365 such as may be arranged in winding sets 1310, 1320, 1315, 1325 (see FIG. 13A). In this arrangement, alternating winding sets 1365A, 1365B may have a 90 degree offset orientation. In the exemplary embodiment shown, the winding orientations may be aligned respectively with the X and Z axes.

Referring now to FIG. 13D1, there is shown a schematic view of a winding arrangement in accordance with another exemplary embodiment. In the exemplary embodiment shown in FIG. 13D1, two winding segments 1365A', 1365B' are illustrated, for example purposes, such as may be used for winding sets 1310, 1320, 1315, 1325 in FIG. 13A. In alternate embodiments there may be more or fewer winding segments. In the exemplary embodiments, the winding segments may have what may be referred to as a generally trapezoidal configuration with the windings pitched at a desired angle to the X,Z axes. The windings of segments 1365A', 1365B' may for example have symmetrically opposing pitch, respectively generating forces Fa, Fb as shown in FIG. 13D1. In the exemplary embodiment, the windings may be overlapped. In alternate embodiments, the windings may have any desired configuration.

FIG. 13D2 shows another exemplary arrangement of individual winding for use with the disclosed embodiments. In FIG. 13D2 individual windings 1380 and 1385 may be oriented 90 degrees from each other and are positioned in an overlapping arrangement. Other suitable arrangements of windings are also contemplated.

Referring again to FIG. 13A the motor force equations may be expressed for example as:

$$F_a = \sum_{j=0}^{2} F_{Aaj} = K_{Aa}(y) \sum_{j=0}^{2} i_{Aj} \sin[\theta_A(x,z) + (2\pi/3)j] \quad (4.1)$$

$$F_b = \sum_{j=0}^{2} F_{Bbj} = K_{Bb}(y) \sum_{j=0}^{2} i_{Bj} \sin[\theta_B(x,z) + (2\pi/3)j] \quad (4.2)$$

$$F_y = \sum_{j=0}^{2} F_{Ayj} + \sum_{j=0}^{2} F_{Byj} \quad (4.3)$$

where:

$$F_{Ayj} = K_{AM}(y) i_{Aj}^2 - K_{AL}(y) i_{Aj} \cos[\theta_A(x,z) + (2\pi/3)j], j=0,1,2 \quad (4.4)$$

$$F_{Byj} = K_{BM}(y) i_{Bj}^2 - K_{BL}(y) i_{Bj} \cos[\theta_B(x,z) + (2\pi/3)j], j=0,1,2 \quad (4.5)$$

utilizing the following nomenclature:
$F_a$=Total force produced in a-direction (N)
$F_b$=Total force produced in b-direction (N)
$F_x$=Total force produced in x-direction (N)
$F_y$=Total force produced in y-direction (N)
$F_z$=Total force produced in z-direction (N)

$F_{Aaj}$=Force produced by phase j of winding set A in a-direction, j=0, 1, 2 (N)
$F_{Ay}$=Total force produced by winding set A in y-direction (N)
$F_{Ayj}$=Force produced by phase j of winding set A in y-direction, j=0, 1, 2 (N)
$F_{Bbj}$=Force produced by phase j of winding set B in b-direction, j=0, 1, 2 (N)
$F_{By}$=Total force produced by winding set B in y-direction (N)
$F_{Byj}$=Force produced by phase j of winding set B in y-direction, j=0, 1, 2 (N)
$I_A$=Amplitude of phase current for winding A (A)
$I_B$=Amplitude of phase current for winding B (A)
$i_{Aj}$=Current through phase j of winding set A, j=0, 1, 2 (N)
$i_{Bj}$=Current through phase j of winding set B, j=0, 1, 2 (N)
$K_{Aa}$=Phase force constant of winding set A in a-direction (N/A)
$K_{Bb}$=Phase force constant of winding set B in b-direction (N/A)
$K_{AL}$=Lorentz phase force constant of winding set A in y-direction (N/A)
$K_{AM}$=Maxwell phase force constant of winding set A in y-direction (N/A$^2$)
$K_{BL}$=Lorentz phase force constant of winding set B in y-direction (N/A)
$K_{BM}$=Maxwell phase force constant of winding set B in y-direction (N/A$^2$)
x=Position in x-direction (m)
y=Position in y-direction (m)
z=Position in z-direction (m)
α=Angular orientation of winding set A (rad)
γ=Angular orientation of winding set B (rad)
$\Delta_A$=Electrical angle offset for winding set A (rad)
$\Delta_B$=Electrical angle offset for winding set B (rad)
$\theta_A$=Electrical angle for winding set A (rad)
$\theta_B$=Electrical angle for winding set B (rad)
$R_{pA}$=Phase resistance of winding set A (Ohms)
$R_{pB}$=Phase resistance of winding set B (Ohms)
β=Y-direction force balance factor between winding sets A and B (no units)

Figure 14:
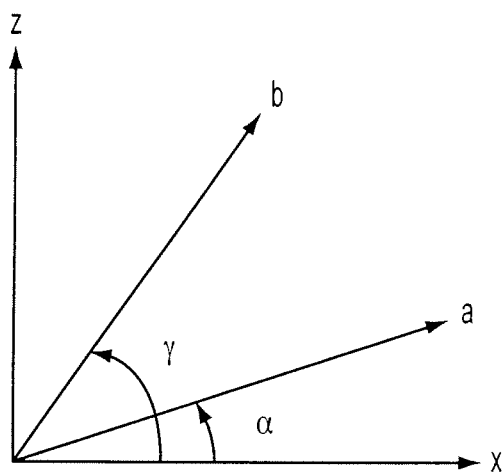
FIG. 14 shows the orientation of the winding sets of the three dimensional motor configuration embodiments where a represents the direction of a force $F_a$ and b represents the direction of a force $F_b$.

FIG. 14 shows the orientation of the winding sets of the three dimensional motor configuration embodiments where a represents the direction of force $F_a$ and b is the direction of force $F_b$.

The following motor commutation equations for example may be utilized:

$$i_{Aj}=I_A \sin[\theta_A(x,z)-\Delta_A+(2\pi/3)j], j=0,1,2 \quad (4.6)$$

$$i_{Bj}=I_B \sin[\theta_B(x,z)-\Delta_B+(2\pi/3)j], j=0,1,2 \quad (4.7)$$

where $I_A$, $\Delta_A$, $I_B$, $\Delta_B$ control magnitudes and orientations of force vectors produced by winding sets A and B.

It should be noted that equations (4.6) and (4.7) are similar to (3.3), (2.3), and (1.3) above. Thus, by adjusting the electrical angle $\theta_A$, $\theta_B$ with the electrical angle offset $\Delta_A$, $\Delta_B$, the same motor commutation equations may be used for producing a one dimensional propulsion force in the x-direction, two dimensional forces including a propulsion force in the x-direction and a guidance force in the y-direction that may be substantially decoupled, and in this embodiment, three dimensional forces including propulsion forces in both the x-direction and a z-direction and a guidance force in the y-direction that may be substantially decoupled from each other.

In other words, by adjusting the electrical angle with the electrical angle offset, at least one, two, and three dimensional substantially independently controllable forces may be produced in the motor using a common set of commutation equations.

Sinusoidal phase currents in accordance with equations (4.4) and (4.5) can be generated, for example, for wye winding configurations using space vector modulation. The resulting motor forces may be expressed for example as:

$$F_a = 1.5 I_A K_{Aa}(y) \cos(\Delta_A) \quad (4.8)$$

$$F_b = 1.5 I_B K_{Bb}(y) \cos(\Delta_B) \quad (4.9)$$

$$F_x = F_a \cos(\alpha) + F_b \cos(\gamma) \quad (4.10)$$

$$F_z = F_a \sin(\alpha) + F_b \sin(\gamma) \quad (4.11)$$

$$F_y = 1.5[I_A K_{AL}(y)\sin(\Delta_A) + I_A^2 K_{AM}(y) + I_B K_{BL}(y)\sin(\Delta_B) + I_B^2 K_{BM}(y)] \quad (4.12)$$

In embodiments using displaced trapezoidal windings (see FIG. 13D1):

$$K_{Aa}(y)=K_{Bb}(y), K_{AL}(y)=K_{BL}(y), K_{AM}(y)=K_{BM}(y) \quad (4.13)$$

$$\gamma=\pi-\alpha \Rightarrow F_x=(F_a-F_b)\cos(\alpha), F_z=(F_a+F_b)\sin(\alpha) \quad (4.14)$$

while in embodiments using orthogonal linear windings (see FIG. 13D2):

$$\alpha=0, \gamma=\pi/2 \Rightarrow F_x=F_a, F_z=F_b \quad (4.15)$$

The independent control parameters $I_A$, $I_B$ and $\Delta_A$, $\Delta_B$ for the winding sets may be for example:

$$I_A = I_A(F_a, F_{Ay}) \quad (4.16)$$

$$\Delta_A = \Delta_A(F_a, F_{Ay}) \quad (4.17)$$

$$I_B = I_B(F_b, F_{By}) \quad (4.18)$$

$$\Delta_B = \Delta_B(F_b, F_{By}) \quad (4.19)$$

where $$F_a = (F_x \sin\gamma - F_z \cos\gamma)/(\cos\alpha \sin\gamma - \sin\alpha \cos\gamma) \quad (4.20)$$

$$F_b = (F_x \sin\alpha - F_z \cos\alpha)/(\sin\alpha \cos\gamma - \cos\alpha \sin\gamma) \quad (4.21)$$

The solution for (4.16) to (4.19) includes finding $I_A$, $\Delta_A$, $I_B$, and $\Delta_B$, given the desired forces $F_x$, $F_z$ and $F_y$. This can be achieved for example by imposing the following "force balancing condition:"

$$F_{Ay} = \beta F_{By} \quad (4.22)$$

where $$F_{Ay} = \sum_{j=0}^{2} F_{Ayj} = 1.5[I_A K_{AL}\sin(\Delta_A) + I_A^2 K_{AM}] \quad (4.23)$$

$$F_{By} = \sum_{j=0}^{2} F_{Byj} = 1.5[I_B K_{BL}\sin(\Delta_B) + I_B^2 K_{BM}] \quad (4.24)$$

are the y-direction force contributions of winding sets A and B, respectively. The parameter β represents the relative force contribution between the two winding sets along the y-direction. If for example β=1, then both winding sets have equal contributions for the y-force component. It is assumed that β is known at any point in time and it does not have to be constant.

In the exemplary embodiment, the motor control parameters may thus be expressed for example as:

$$I_A = \frac{\sqrt{2}}{3} \frac{K_{AL}}{K_{AM}} \sqrt{\frac{9}{4} + 3\frac{(\beta+1)}{\beta} \frac{K_{AM}}{K_{AL}} \frac{F_y}{K_{AL}} + \sqrt{\delta_A}} \quad (4.56)$$

$$\Delta_A = \mathrm{atan}\left[\frac{\frac{\beta}{(\beta+1)}\frac{F_y}{K_{fyL}} - 1.5I^2\frac{K_{AM}}{K_{AL}}}{\frac{F_a}{K_{Aa}}}\right] \quad (4.57)$$

$$I_B = \frac{\sqrt{2}}{3} \frac{K_{BL}}{K_{BM}} \sqrt{\frac{9}{4} + \frac{3}{(\beta+1)} \frac{K_{BM}}{K_{BL}} \frac{F_y}{K_{BL}} + \sqrt{\delta_B}} \quad (4.58)$$

$$\Delta_B = \mathrm{atan}\left[\frac{\frac{1}{(1+\beta)}\frac{F_y}{K_{BL}} - 1.5I^2\frac{K_{BM}}{K_{BL}}}{\frac{F_b}{K_{Bb}}}\right] \quad (4.59)$$

where, $$\delta_A = b_A^2 - 4a_A c_A \ge 0 \quad (4.46)$$

and $$\delta_B = b_B^2 - 4a_B c_B \ge 0 \quad (4.47)$$

$$a_A = \frac{9}{4}\left[\frac{K_{AM}}{K_{AL}}\right]^2 \quad (4.42)$$

$$b_A = -\left[\frac{9}{4} + \frac{3F_y \beta K_{AM}}{(\beta+1)K_{AL}^2}\right] \quad (4.43)$$

$$c_A = \left[\frac{F_a}{K_{Aa}}\right]^2 + \left[\frac{\beta F_y}{(\beta+1)K_{AL}}\right]^2 \quad (4.44)$$

$$a_B = \frac{9}{4}\left[\frac{K_{BM}}{K_{BL}}\right]^2 \quad (4.31)$$

$$b_B = -\left[\frac{9}{4} + \frac{3F_y K_{BM}}{(\beta+1)K_{BL}^2}\right] \quad (4.32)$$

$$c_B = \left[\frac{F_y}{(\beta+1)K_{BL}}\right]^2 + \left[\frac{F_b}{K_{Bb}}\right]^2 \quad (4.33)$$

The motor force coupling of the propulsion and guidance forces are represented as:

$$\frac{F_y}{K_{BL}} \ge (\beta+1)\left[\frac{2}{3}\frac{K_{BM}}{K_{BL}}\left(\frac{F_b}{K_{Bb}}\right)^2 - \frac{3}{8}\frac{K_{BL}}{K_{BM}}\right] \quad (4.54)$$

$$\frac{F_y}{K_{AL}} \ge \frac{\beta+1}{\beta}\left[\frac{2}{3}\frac{K_{AM}}{K_{AL}}\left(\frac{F_a}{K_{Aa}}\right)^2 - \frac{3}{8}\frac{K_{AL}}{K_{AM}}\right] \quad (4.55)$$

Referring still to FIG. 13A, in a magnetically levitated material transport system having a propulsion system according to the exemplary embodiment, there may be another winding set (1310, 1325, 1320, 1315) on opposite sides of the guidance system that may generate y-forces with opposing signs and the controller may effect control of opposing windings as desired (and as previously described) to substantially decouple Y-forces from X and Z forces.

Figure 15:
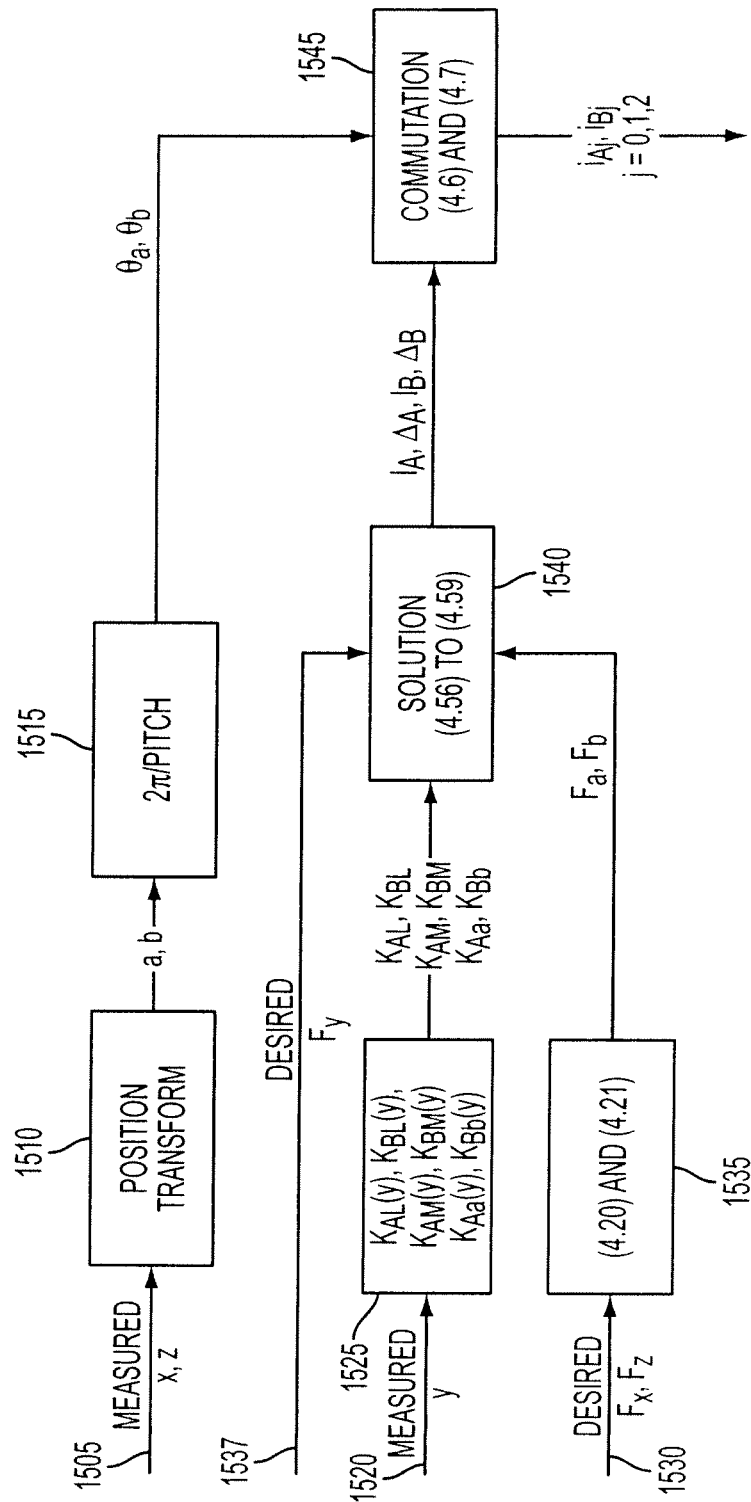
FIG. 15 shows a diagram of a solution process for performing commutation to produce propulsion in the x-direction and lift in the z-direction using Lorentz forces, and a guidance component in the y-direction with Lorentz and Maxwell forces.

FIG. 15 shows a diagram of a solution process 1500 for performing commutation to produce the propulsion in the x-direction and lift in the z-direction using Lorentz forces, and the guidance component in the y-direction with Lorentz and Maxwell forces as described above. The solution process 1500 may be implemented in any combination of hardware or software. Measured x and z position coordinates 1505 may be retrieved from receiver 1395 (FIG. 13A) and provided to position transform circuitry 1510 which translates the x and z position coordinates into a and b positions (FIG. 14). The results are provided to electrical angle determination circuitry 1515.

Electrical angle determination circuitry 1515 factors the a and b positions by $2\pi$ and the pitch of the windings to determine electrical angles $\theta_a$ and $\theta_b$. A measured y position coordinate 1520 may be retrieved from sensors (similar to sensors 1390 1395 FIG. 13A), and provided to a phase force constant determination block 1525 where predetermined phase force constants for the A and B winding sets in the a and b directions are obtained. In addition, Lorentz and Maxwell phase force constants for winding sets A and B in the y-direction are obtained. Desired forces in the x and z direction 1530 are applied to circuitry or program 1535 implementing equations (4.20) and (4.21) that translates the x and z direction forces into forces in the a and b directions. The forces in the a and b directions, the results of the phase force constant determination block 1525, and a desired force in the y direction 1537 are applied to control parameter circuitry or program 1540 implementing equations (4.56) through (4.59) to yield control parameters $I_A$, $I_B$ and $\Delta_A$, $\Delta_B$ for winding sets A and B. Electrical angles $\theta_a$ and $\theta_b$ and control parameters $I_A$, $I_B$ and $\Delta_A$, $\Delta_B$ for winding sets A and B are applied to commutation function 1545 which implements equations (4.6) and (4.7) to provide commutation currents $i_a$ and $i_b$ for each winding phase j of winding sets A and B.

The embodiment of FIG. 13A may also be designed in a manner that provides propulsion in the x-direction and lift in the z-direction by Lorentz forces, and guidance in the y-direction by Maxwell forces.

As noted before, the following motor force equations may be defined for example as:

$$F_a = \sum_{j=0}^{2} F_{Aaj} = K_{Aa}(y) \sum_{j=0}^{2} i_{Aj} \sin[\theta_A(x,z) + (2\pi/3)j] \quad (5.1)$$

$$F_b = \sum_{j=0}^{2} F_{Bbj} = K_{Bb}(y) \sum_{j=0}^{2} i_{Bj} \sin[\theta_B(x,z) + (2\pi/3)j] \quad (5.2)$$

$$F_y = \sum_{j=0}^{2} F_{Ayj} + \sum_{j=0}^{2} F_{Byj} = K_{Ay}(y) \sum_{j=0}^{2} i_{Aj}^2 + K_{By}(y) \sum_{j=0}^{2} i_{Bj}^2 \quad (5.3)$$

where $K_{Ay}$=Phase force constant of winding set A in y-direction (N/A$^2$)

$K_{By}$=Phase force constant of winding set B in y-direction (N/A$^2$)

Also, the following motor commutation equations may be used:

$$i_{Aj} = I_A \sin[\theta_A(x,z) + \Delta_A + (2\pi/3)j], j=0,1,2 \quad (5.4)$$

$$i_{Bj} = I_B \sin[\theta_B(x,z) + \Delta_B + (2\pi/3)j], j=0,1,2 \quad (5.5)$$

As noted above, (5.4) and (5.5) are the same as (4.6) and (4.7), respectively, and are similar to (3.3), (2.3), and (1.3).) By adjusting the electrical angle(s) $\theta_A$, $\theta_B$ of the winding sets with the electrical angle offset(s) $\Delta_A$, $\Delta_B$, the same motor commutation equations may be used for producing at least one, two, and three dimensional forces that are substantially decoupled from each other. As with other embodiments described herein, sinusoidal phase currents in accordance with Equations (5.4) and (5.5) may be generated using space vector modulation for example for wye winding configuration the winding sets.

The motor forces for example may be as follows:

$$F_a = 1.5 I_A K_{Aa}(y)\cos(\Delta_A) \tag{5.6}$$

$$F_b = 1.5 I_B K_{Bb}(y)\cos(\Delta_B) \tag{5.7}$$

$$F_x = F_a \cos(\alpha) + F_b \cos(\gamma) \tag{5.8}$$

$$(5.9) F_z = F_a \sin(\alpha) + F_b \sin(\gamma) \tag{5.9}$$

$$F_y = 1.5[I_A^2 K_{Ay}(y) + I_B^2 K_{By}(y)] \tag{5.10}$$

The motor force coupling of the propulsion and guidance forces are represented as:

$$F_y = \frac{1}{1.5}\left[\left(\frac{F_a}{K_{Aa}(y)\cos(\Delta_A)}\right)^2 K_{Ay}(y) + \left(\frac{F_b}{K_{Bb}(y)\cos(\Delta_B)}\right)^2 K_{By}(y)\right] \tag{5.11}$$

$$F_y \geq \frac{1}{1.5}\left[\left(\frac{F_a}{K_{Aa}(y)}\right)^2 K_{Ay}(y) + \left(\frac{F_b}{K_{Bb}(y)}\right)^2 K_{By}(y)\right] \tag{5.12}$$

For embodiments utilizing displaced trapezoidal windings:

$$K_{Aa}(y) = K_{Bb}(y), K_{Ay}(y) = K_{By}(y) \tag{5.13}$$

$$\gamma = \pi - \alpha \Rightarrow F_x = (F_a - F_b)\cos(\alpha), F_z = (F_z + F_b)\sin(\alpha) \tag{5.14}$$

while for embodiments using orthogonal linear windings:

$$\alpha = 0, \gamma = \pi/2 \Rightarrow F_x = F_a, F_z = F_b \tag{5.15}$$

The independent control parameters $I_A$, $I_B$ and $\Delta_A$, $I_B$ for the winding sets A and B may be derived as:

$$I_A = \sqrt{F_{Ay}/[1.5 K_{Ay}(y)]} \tag{5.16}$$

$$I_B = \sqrt{F_{By}/[1.5 K_{By}(y)]} \tag{5.17}$$

$$\Delta_A = a\cos\{F_a/[1.5 I_A K_{Aa}(y)]\} \tag{5.18}$$

$$\Delta_B = a\cos\{F_b/[1.5 I_B K_{Bb}(y)]\} \tag{5.19}$$

where $$F_a = (F_x \sin\gamma - F_z \cos\gamma)/(\cos\alpha \sin\gamma - \sin\alpha \cos\gamma) \tag{5.20}$$

$$F_b = (F_x \sin\alpha - F_z \cos\alpha)/(\sin\alpha \cos\gamma - \cos\alpha \sin\gamma) \tag{5.21}$$

Figure 16:
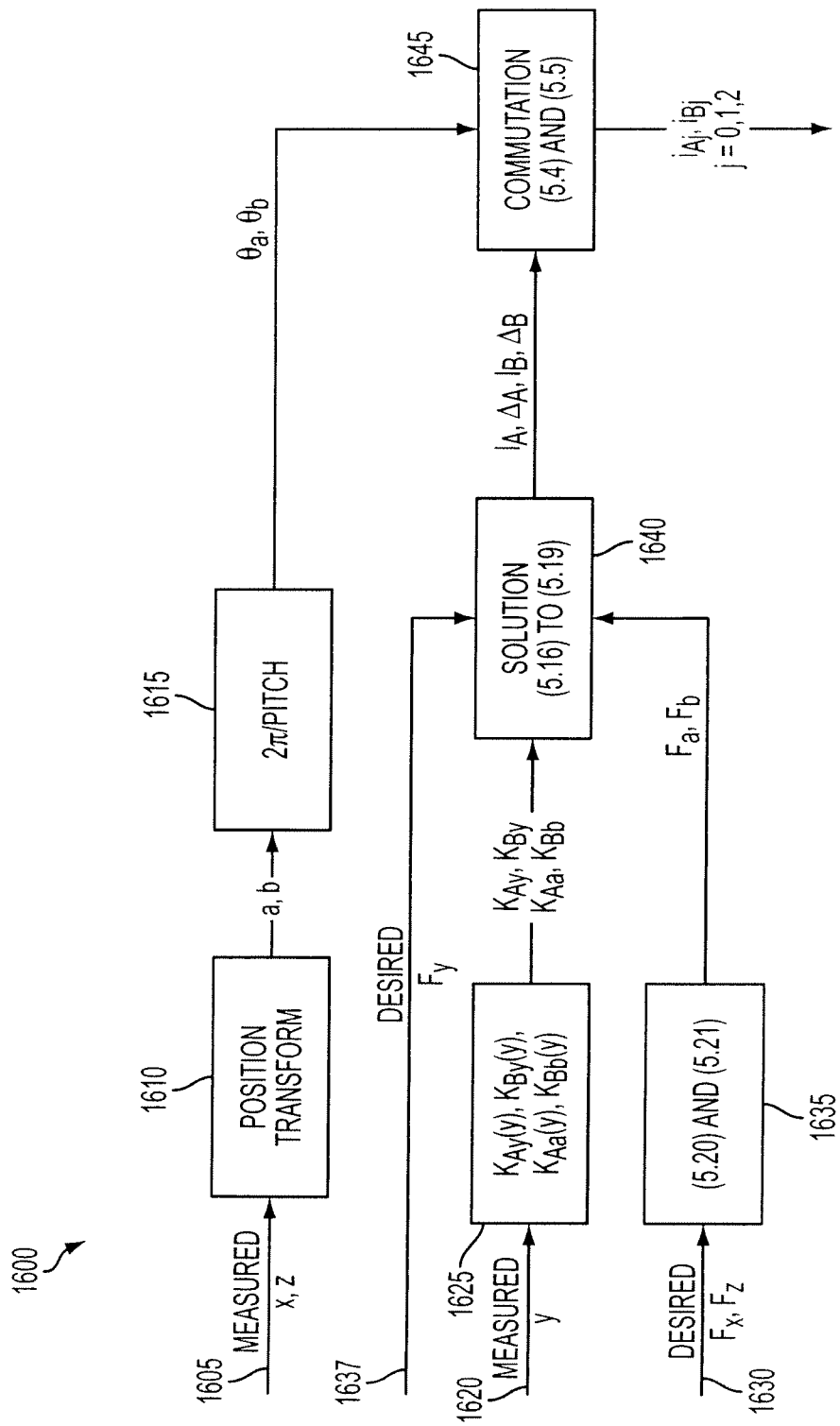
FIG. 16 shows a diagram of a solution process for performing commutation to produce propulsion components in the x and z-directions with Lorentz forces and a guidance component in the y-direction with Maxwell forces.

FIG. 16 shows a diagram of a solution process 1600 for performing commutation to produce propulsion components in the x and z-directions with Lorentz forces and a guidance component in the y-direction with Maxwell forces as described above. The solution process 1600 may be implemented in any combination of hardware or software. Measured x and z position coordinates 1605 may be retrieved from receiver 1395 (FIG. 13A) and provided to position transform circuitry or program 1610 which translates the x and z position coordinates into a and b positions (FIG. 14). The results are provided to electrical angle determination circuitry 1615.

Electrical angle determination circuitry 1615 factors the a and b positions by $2\pi$ and the pitch of the windings to determine electrical angles $\theta_a$ and $\theta_b$. A measured y position coordinate 1620 may be retrieved from sensors (similar to sensor 1390, 1395 FIG. 13A) and provided to a phase force constant determination block 1625 where predetermined phase force constants for the A and B winding sets in the a, b, and y directions are obtained. Desired forces in the x and z direction 1630 are applied to circuitry or program 1635 implementing equations (5.20) and (5.21) that translates the x and z direction forces into forces in the a and b directions. The forces in the a and b directions, the results of the phase force constant determination block 1625, and a desired force in the y-direction 1637 are applied to control parameter circuitry or program 1640 implementing equations (5.16) through (5.19) to yield control parameters $I_A$, $I_B$ and $\Delta_A$, $\Delta_B$ for winding sets A and B. Electrical angles $\theta_a$ and $\theta_b$ and control parameters $I_A$, $I_B$ and $\Delta$, $\Delta_B$ for winding sets A and B are applied to commutation function 1645 which implements equations (5.4) and (5.5) to provide commutation currents $i_a$ and $i_b$ for each winding phase j of winding sets A and B.

The embodiment of FIG. 13A may also be designed in a manner that provides three dimensional forces supplying propulsion in the x-direction, lift in the z-direction, and guidance in the y-direction utilizing Lorentz forces.

In this case the motor force equations may be for example expressed as:

$$F_a = \sum_{j=0}^{2} F_{Aaj} = K_{Aa}(y)\sum_{j=0}^{2} i_{Aj}\sin[\theta_A(x,z) + (2\pi/3)j] \tag{6.1}$$

$$F_b = \sum_{j=0}^{2} F_{Bbj} = K_{Bb}(y)\sum_{j=0}^{2} i_{Bj}\sin[\theta_B(x,z) + (2\pi/3)j] \tag{6.1}$$

$$F_{Ay} = \sum_{j=0}^{2} F_{Ayj} = -K_{Ay}(y)\sum_{j=0}^{2} i_{Aj}\cos[\theta_A(x,z) + (2\pi/3)j] \tag{6.2}$$

$$F_{By} = \sum_{j=0}^{2} F_{Byj} = -K_{By}(y)\sum_{j=0}^{2} i_{Bj}\cos[\theta_B(x,z) + (2\pi/3)j] \tag{6.3}$$

$$F_y = F_{Ay} + F_{By} \tag{6.4}$$

The motor commutation equations may be for example as follows:

$$i_{Aj} = I_A \sin[\theta_A(x,z) - \Delta_A + (2\pi/3)j] \tag{6.5}$$

$$i_{Bj} = I_B \sin[\theta_B(x,z) - \Delta_B + (2\pi/3)j] \tag{6.6}$$

where again j=0, 1 and 2 represent phases 0, 1 and 2, respectively, and $I_A$, $\Delta_A$, $I_B$, $\Delta_B$ are independent parameters to control magnitudes and orientations of force vectors produced by winding sets A and B.

As with the other embodiments, (6.5) and (6.6) are the same as (5.4) and (5.5), and (4.6) and (4.7), respectively, and are similar to (3.3), (2.3), and (1.3). By adjusting the electrical angle(s) $\theta_A$, $\theta_B$ with the electrical angle offset(S) $\Delta_A$, $\Delta_B$, the same motor commutation equations may be used for producing at least one, two, and three dimensional forces decoupled from each other.

Sinusoidal phase currents in accordance with Equations (6.6) and (6.7) can be generated using space vector modulation for example for wye winding configuration.

The following motor force equations result:

$$F_a = 1.5 I_A K_{Aa}(y)\cos(\Delta_A) \tag{6.7}$$

$$F_x = F_a \cos(\alpha) + F_b \cos(\gamma) \tag{6.8}$$

$$F_z = F_a \sin(\alpha) + F_b \sin(\gamma) \tag{6.9}$$

$$F_{Ay} = 1.5 I_A K_{Ay}(y)\sin(\Delta_A) \tag{6.10}$$

$$F_{By} = 1.5 I_B K_{By}(y)\sin(\Delta_B) \tag{6.11}$$

$$F_y = 1.5[I_A K_{Ay}(y)\sin(\Delta_A) + I_B K_{By}(y)\sin(\Delta_B)] \tag{6.12}$$

In an exemplary embodiment using displaced trapezoidal windings (see FIG. 13D1:

$$K_{Aa}(y)=K_{Bb}(y), K_{Ay}(y)=K_{By}(y) \qquad (6.13)$$

$$\gamma=\pi-\alpha \Rightarrow F_x=(F_a-F_b)\cos(\alpha), F_z=(F_a+F_b)\sin(\alpha) \qquad (6.14)$$

while in an exemplary embodiment using orthogonal linear windings (see FIG. 13D2):

$$\alpha=0, \gamma=\pi/2 \Rightarrow F_x=F_a, F_z=F_b \qquad (6.13)$$

To solve $I_A$, $\Delta_A$, $I_B$ and $\Delta_B$ in terms of $F_x$, $F_y$ and $F_z$ the force balance condition may be employed for example:

$$F_{Ay}=\beta F_{By} \qquad (6.14)$$

The parameter $\beta$ may be known using certain criteria, for example as described below. The control parameters may thus be defined for example as:

$$I_A = \frac{2}{3}\sqrt{\left[\frac{F_a}{K_{Aa}(y)}\right]^2 + \left[\frac{\beta}{(\beta+1)}\frac{F_y}{K_{Ay}(y)}\right]^2} \qquad (6.15)$$

$$\Delta_A = \operatorname{atan}\left[\frac{\beta}{(\beta+1)}\frac{K_{Aa}(y)}{K_{Ay}(y)}\frac{F_y}{F_a}\right] \qquad (6.16)$$

and: $\qquad (6.17)$ $$I_B = \frac{2}{3}\sqrt{\left[\frac{F_b}{K_{Bb}(y)}\right]^2 + \left[\frac{1}{(\beta+1)}\frac{F_y}{K_{By}(y)}\right]^2}$$

$$\Delta_B = \operatorname{atan}\left[\frac{1}{(\beta+1)}\frac{K_{Bb}(y)}{K_{By}(y)}\frac{F_y}{F_b}\right] \qquad (6.18)$$

Where for example:

$$F_a=(F_x \sin \gamma - F_z \cos \gamma)/(\cos \alpha \sin \gamma - \sin \alpha \cos \gamma) \qquad (6.19)$$

$$F_b=(F_x \sin \alpha - F_z \cos \alpha)/(\sin \alpha \cos \gamma - \cos \alpha \sin \gamma) \qquad (6.20)$$

Figure 17:
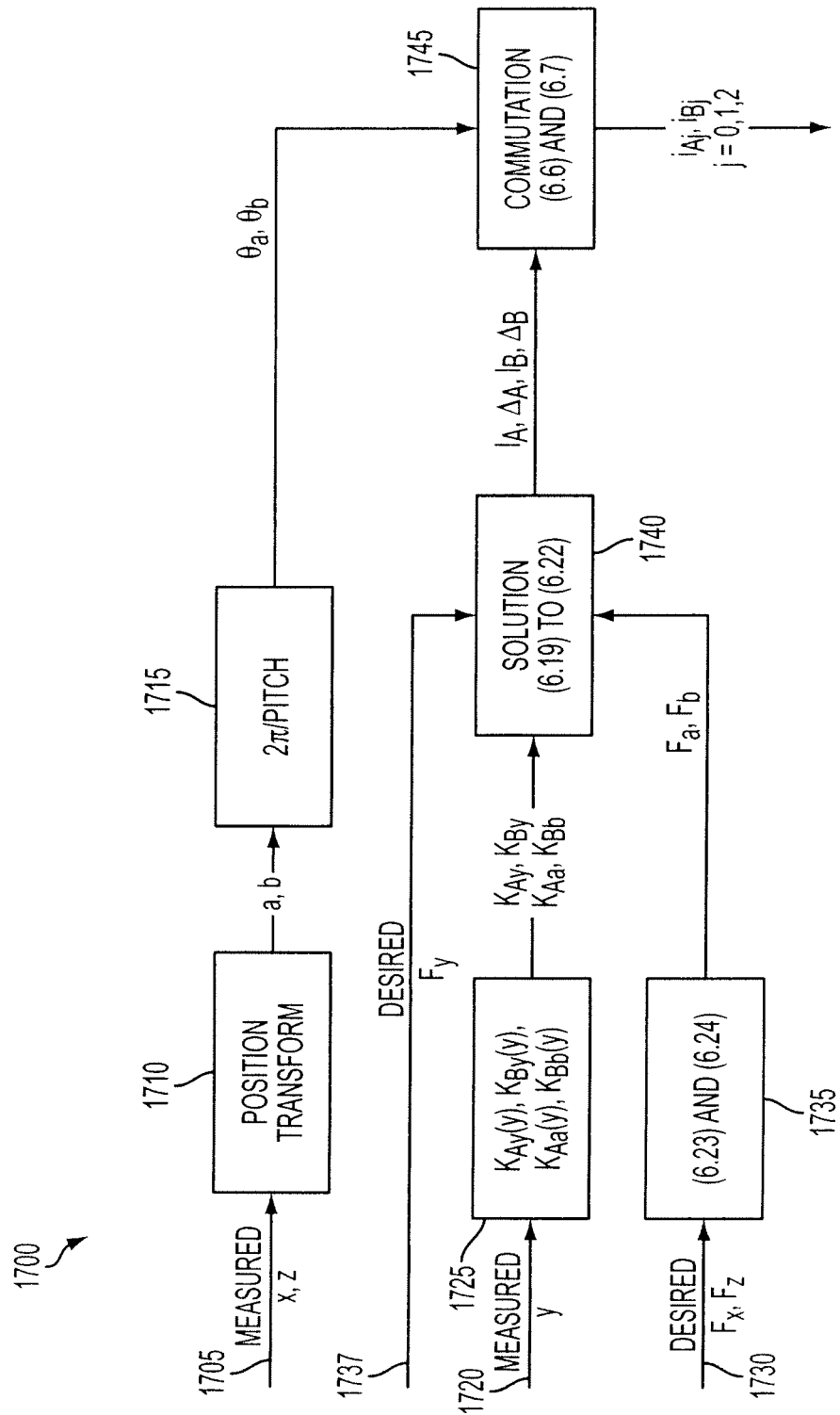
FIG. 17 shows a diagram of a solution process for performing commutation to produce propulsion components in the x and z directions and a guidance component in the y-direction, all with Lorentz forces.

FIG. 17 shows a diagram of a solution process 1700 for performing commutation to produce substantially decoupled propulsion components in the x and z directions and a guidance component in the y-direction, all with Lorentz forces for example as described above. The solution process 1700 is similar to the solution process of FIG. 16 and may be implemented in any combination of hardware or software. Measured x and z position coordinates 1705 may be retrieved from sensors (similar to sensors 1390, 1395 FIG. 13A) and provided to position transform circuitry or program 1710 which translates the x and z position coordinates into a and b positions (FIG. 14). The results are provided to electrical angle determination circuitry 1715 which factors the a and b positions by $2\pi$ and the pitch of the windings to determine electrical angles $\theta_a$ and $\theta_b$. A measured y position coordinate 1720 may be retrieved from receiver 1395 and provided to a phase force constant determination block 1725 where predetermined phase force constants for the A and B winding sets in the a, b, and y directions are obtained. Desired forces in the x and z direction 1730 are applied to circuitry 1735 implementing equations (6.22) and (6.23) that translates the x and z direction forces into forces in the a and b directions. The forces in the a and b directions, the results of the phase force constant determination block 1725, and a desired force in the y-direction 1737 are applied to control parameter circuitry or program 1740 implementing equations (6.19) through (6.22) to yield control parameters $I_A$, $I_B$ and $\Delta_A$, $\Delta_B$ for winding sets A and B. Electrical angles $\theta_a$ and $\theta_b$ and control parameters $I_A$, $I_B$ and $\Delta_A$, $\Delta_B$ for winding sets A and B are applied to commutation function 1745 which implements equations (5.4) and (5.5) to provide commutation currents $i_a$ and $i_b$ for each winding phase j of winding sets A and B.

The selection of the parameter $\beta$ described in the embodiments above may be obtained by different optimization criteria. Depending on the types of forces involved, different criteria can be used. For example if only Lorentz forces are present, the force ratio criterion may be more appropriate. If the effect of back-electromotive forces (BEMF) is relevant, then the force ratio can be modified to account for that. If Maxwell forces are relevant as well, then the selection of $\beta$ can be based on the ratio of phase amplitude currents. Additional criterion can be based on the powers consumed by the windings. The various criteria are explained below.

Assuming that only Lorentz forces are present, for example as in the embodiments described above, one possible criterion is to select $\beta$ such that the contributions of winding sets A and B are chosen taking into account their maximum rated current and consequently their maximum rated forces along y-direction. This criterion may be expressed for example as:

$$\left|\frac{F_{Ay}}{F_{Ay}^{Max}}\right| = \left|\frac{F_{By}}{F_{By}^{Max}}\right| \qquad (7.1)$$

where $$F_{Ay}^{Max} = 1.5 I_A^{Max} K_{Ay} \qquad (7.2)$$

$$F_{By}^{Max} = 1.5 I_B^{Max} K_{By} \qquad (7.3)$$

Using the (6.16) condition, $$\beta = \frac{F_{Ay}^{Max}}{F_{By}^{Max}} \qquad (7.4)$$

A generalization of the criterion (7.1) may be obtained by taking into account the effect of BEMF, which limits the maximum possible phase current amplitudes to account for the bus or supply voltage ($V_{bus}$) being finite.

The maximum phase current amplitudes for winding sets A and B may be expressed for example in terms of the bus voltage, phase resistance, BEMF and motor speed as:

$$I_A^{Max} = \frac{\rho V_{bus} - K_A^{BEMF} \omega_A}{R_{pA}} \qquad (7.5)$$

$$I_B^{Max} = \frac{\rho V_{bus} - K_B^{BEMF} \omega_B}{R_{pB}} \qquad (7.6)$$

$I_A^{Max}$=Maximum rated amplitude of phase current for winding A (A)
$I_B^{Max}$=Maximum rated amplitude of phase current for winding B (A)
$\omega_A$=Mechanical angular speed for winding set A (rad/sec)
$\omega_B$=Mechanical angular speed for winding set B (rad/sec)
$\rho$=0.5 for a wye-wound winding set and $$\rho = \frac{\sqrt{3}}{2}$$

for a delta-wound winding set.

Using (7.5) and (7.6) in (7.2) and (7.3), $\beta$ may be computed as:

$$\beta = \frac{(\rho V_{Bus} - K_A^{BEMF} \omega_A)}{(\rho V_{Bus} - K_B^{BEMF} \omega_B)} \frac{R_{pB}}{R_{pA}} \frac{K_{Ay}}{K_{By}} \quad (7.7)$$

which provides a criterion for a speed dependent $\beta$.

In the embodiments where Maxwell and Lorentz forces are present the relations between forces and currents are non-linear. In this situation it may be desired to establish a criterion based on the phase current amplitude ratios (rather than force ratios, see (7.1)) as described below.

$$\left|\frac{I_A}{I_A^{Max}}\right| = \left|\frac{I_B}{I_B^{Max}}\right| \quad (7.8)$$

The effect of BEMF can be included in the calculation of $I_A^{Max}$ and $I_B^{Max}$ as described above. The currents $I_A$ and $I_B$ are the solutions (6.18) and (6.20) or (4.57) and (4.59). The term $\beta$ can be obtained from (7.8) after substitution of the appropriate solution.

In alternate embodiments, the phase current amplitude ratio may be convenient when the current-force relationship is linear, (e.g., when Lorentz forces are dominant) because it distributes the gap control force to the winding that is currently less utilized to provide propulsion. By way of example, considering that winding A provides force in the x-direction and winding B in the z-direction, when the system does not move in the x-direction and accelerates in the z-direction, winding A would provide larger portion of y-direction force. Conversely, if the system accelerates in the x-direction and does not apply much force in the z-direction, winding B would be providing larger portion of the y-direction force.

By way of example, an additional criterion that may be used:

$$\left|\frac{P_A}{P_A^{Max}}\right| = \left|\frac{P_B}{P_B^{Max}}\right| \quad (7.9)$$

where, $P_d$ is the total power at the winding set d (d=A or B) and $P_d^{Max}$ is the maximum rated power for winding set d (d=A or B).

Referring now also to FIGS. 18A-18D, phase commutation may be employed for example to achieve closed loop position control (see FIG. 18A) with open loop stabilization effects. Commutation may be performed that achieves open loop roll stabilization (see FIG. 18B), open loop pitch stabilization (see FIG. 18C) with discrete forces, and open loop pitch stabilization with distributed forces (see FIG. 18D).

Figure 18A:
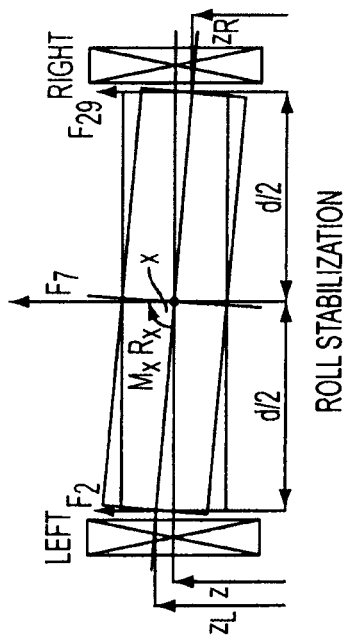
FIGS. 18A-18D show various force diagrams for an open loop stabilization method applied to different degrees of freedom.

FIGS. 18A-18D are schematic end and side elevation views of propulsion system in accordance with another exemplary embodiment having a three dimensional motor formed from a number of two dimensional windings similar to that shown in FIG. 13D. In the exemplary embodiment 1810, 1815 there are two motors (shown for example purposes), one on the left hand side and the other on the right hand side of platform 1805. The motors may be wired together, (e.g., they are not controlled independently). As may be realized as associated benefit of phase commutation with open-loop stabilization may be that because the motors are wired together, the complexity of the controller hardware may be reduced. Referring to FIG. 18A, and the equations below, for phase commutation for open loop stabilization the following nomenclature may be used for example:

$F_z$=Total force in z-direction (N)
$F_{zL}$=Force in z-direction produced by left motor (N)
$F_{zR}$=Force in z-direction produced by right motor (N)
I=Amplitude of phase current (A)
$i_j$=Current through phase j, j=0, 1, 2 (A)
K=Force constant (N/A)
$M_x$=Moment about x-axis (Nm)
p=Motor pitch (corresponding to electrical angle change of $2\pi$) (m)
$R_x$=Rotation about x-axis (rad)
$\Delta$=Electrical angle offset used for control purposes (rad)
$\theta$=Electrical angle used for commutation purposes (rad)

The motor force equations may be expressed for example as:

$$F_{zL} = K \sum_{j=0}^{2} i_j \sin[\theta(z) + (2\pi/3)j] \quad (8.1)$$

$$F_{zR} = K \sum_{j=0}^{2} i_j \sin[\theta(z) + (2\pi/3)j] \quad (8.2)$$

and the motor commutation equation may for example be $$i_j = I \sin [\theta(z) + \Delta + (2\pi/3)j - \pi/2], j=0,1,2 \quad (8.3)$$

where I is a constant and $\Delta$ is a control parameter.

The resulting motor forces may for example be:

$$F_{zL} = 1.5IK \sin(\Delta) \quad (8.4)$$

$$F_{zR} = 1.5IK \sin(\Delta) \quad (8.5)$$

$$F_z = F_{zL} + F_{zR} = 3IK \sin(\Delta) \quad (8.6)$$

and hence the control parameter $\Delta$ may be established as $$\Delta = a \sin [F_z/(3KI)] \quad (8.7)$$

Figure 18B:
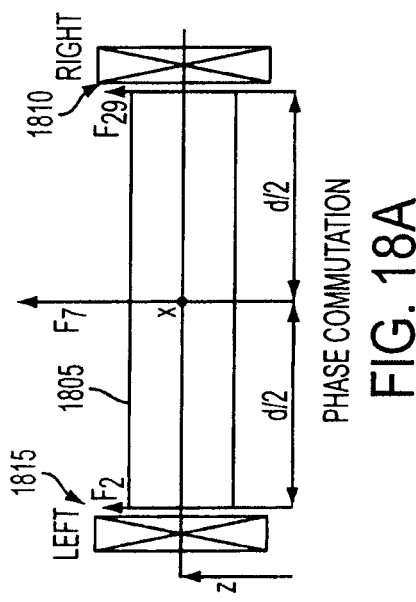

Referring to FIG. 18B, in the exemplary embodiment the equations for open loop roll stabilization, (in the case of roll about the X axis for example) may be used:

$$F_{zL} = K \sum_{j=0}^{2} i_j \sin[\theta_L(z) + (2\pi/3)j] = K \sum_{j=0}^{2} i_j \sin[\theta(z) + \Delta_L + (2\pi/3)j] \quad (8.8)$$

$$F_{zR} = K \sum_{j=0}^{2} i_j \sin[\theta_R(z) + (2\pi/3)j] = K \sum_{j=0}^{2} i_j \sin[\theta(z) + \Delta_R + (2\pi/3)j] \quad (8.9)$$

where
$\theta_L$=Electrical angle for left motor (rad)
$\theta_R$=Electrical angle for right motor (rad)
$\Delta_L$=Electrical angle offset corresponding to displacement due to roll for left motor (rad)
$\Delta_R$=Electrical angle offset corresponding to displacement due to roll for right motor (rad)

and the following motor commutation equation may be used:

$$i_j = I \sin [\theta(z) + \Delta + (2\pi/3)j - \pi/2], j=0,1,2 \quad (8.10)$$

where I is a constant and $\Delta$ is a control parameter.

The resulting motor forces and moment may for example be:

$$F_{zL} = 1.5IK \sin(\Delta - \Delta_L) \quad (8.11)$$

$$F_{zR} = 1.5IK \sin(\Delta - \Delta_R) \quad (8.12)$$

$$F_z = F_{zL} + F_{zR} = 1.5IK[\sin(\Delta - \Delta_L) + \sin(\Delta - \Delta_R)] \quad (8.13a)$$

$$F_z = 1.5IK[\sin \Delta (\cos \Delta_L + \cos \Delta_R) - \cos \Delta (\sin \Delta_L + \sin \Delta_R)] \quad (8.13b)$$

$$M_x = F_{zL}d_y/2 + F_{zR}d_y/2 = 1.5IKd_y/2[\sin(\Delta-\Delta_L)-\sin(\Delta-\Delta_R)] \quad (8.14a)$$

$$M_x = 1.5IKd_y/2[\sin\Delta(\cos\Delta_L-\cos\Delta_R)-\cos\Delta(\sin\Delta_L-\sin\Delta_R)] \quad (8.14b)$$

Considering in the example shown pure roll of the platform, i.e., rotation with respect to the x-axis, $\Delta_L = -\Delta_R = \Delta_{LR}$ and:

$$F_z = 3IK\sin(\Delta)\cos(\Delta_{LR}) \quad (8.15)$$

$$M_x = -1.5IKd_y\cos(\Delta)\sin(\Delta_{LR}) \quad (8.16)$$

As may be realized, in the exemplary embodiment (e.g. of open-loop stabilization) the roll is expected to be small. Hence, for example $|\Delta_{LR}|$ small the equation may be expressed as:

$$F_z = 3IK\sin(\Delta) \quad (8.17)$$

$$M_x = -1.5IKd_y\cos(\Delta)\Delta_{LR} = -[1.5\pi IKd_y^2\cos(\Delta)/p]R_x \quad (8.18)$$

where $M_x$ is a stabilization moment providing roll stiffness that depends on K, $d_y$, p, I and $\Delta$. (It should be noted that, in the exemplary embodiment, amplitude commutation may not provide a stabilization moment ($\Delta=\pi/2 \Rightarrow M_x=0$).)

Hence, the control parameter $\Delta$ may be established as:

$$\Delta = a\sin[F_z/(3KI)] \quad (8.19)$$

Similar as in Equation (8.7). Alternatively, amplitude I and phase $\Delta$ may be calculated together, in the exemplary embodiment, to keep roll stiffness constant. As another alternative, amplitude I may be used to produce Maxwell forces for guidance control in the y-direction.

Figure 18C:
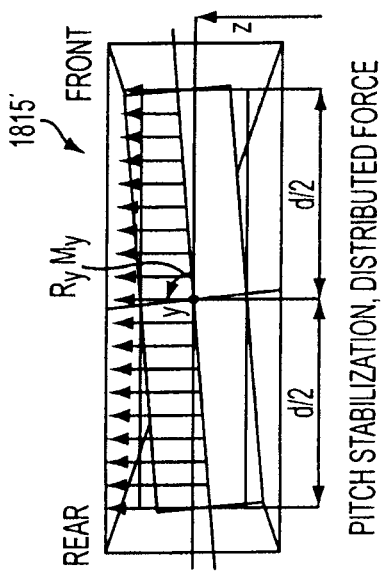

Referring now to FIG. 18C, there is shown a schematic side view of the motor illustrating forces and moments operating on the platform for open loop pitch stabilization with discrete forces. In the exemplary embodiment, motor 1815 may include a number of discrete motors 1815A, 1815B (e.g. there are two motors (winding sets) or motor (winding) segments shown in the figure for example purposes) along the side of the platform. The locations of the motors 1815A, 1815B (e.g. one at the front portion and another one at the rear portion, is merely exemplary. The motor windings may be wired together (connected) such as for common commutation control. In other words, they are not controlled independently. In the exemplary embodiment, the motor force equations may be expressed for example as:

$$F_{zF} = K\sum_{j=0}^{2} i_j \sin[\theta_F(z)+(2\pi/3)j] = K\sum_{j=0}^{2} i_j \sin[\theta(z)+\Delta_F+(2\pi/3)j] \quad (8.20)$$

$$F_{zR} = K\sum_{j=0}^{2} i_j \sin[\theta_R(z)+(2\pi/3)j] = K\sum_{j=0}^{2} i_j \sin[\theta(z)+\Delta_R+(2\pi/3)j] \quad (8.21)$$

where
$F_{zF}$=Force in z-direction produced by front motor (N)
$F_{zR}$=Force in z-direction produced by rear motor (N)
$\theta_F$=Electrical angle for front motor (rad)
$\theta_R$=Electrical angle for rear motor (rad)
$\Delta_F$=Electrical angle offset corresponding to displacement due to pitch for front motor (rad)
$\Delta_R$=Electrical angle offset corresponding to displacement due to pitch for rear motor (rad)

The following exemplary motor commutation equation may be used:

$$i_j = I\sin[\theta(z)+\Delta+(2\pi/3)j-\pi/2], j=0,1,2 \quad (8.22)$$

where I is a constant and $\Delta$ is a control parameter

Accordingly, he resulting motor forces and moment may be expressed for example as:

$$F_{zF} = 1.5IK\sin(\Delta-\Delta_F) \quad (8.23)$$

$$F_{zR} = 1.5IK\sin(\Delta-\Delta_R) \quad (8.24)$$

$$F_z = F_{zF}+F_{zR} = 1.5IK[\sin(\Delta-\Delta_F)+\sin(\Delta-\Delta_R)] \quad (8.25a)$$

$$F_z = 1.5IK[\sin\Delta(\cos\Delta_F+\cos\Delta_R)-\cos\Delta(\sin\Delta_F+\sin\Delta_R)] \quad (8.25b)$$

$$M_y = F_{zF}d_x/2 + F_{zR}d_x/2 = 1.5IKd_x/2[\sin(\Delta-\Delta_F)-\sin(\Delta-\Delta_R)] \quad (8.26a)$$

$$M_y = 1.5IKd_x/2[\sin\Delta(\cos\Delta_F-\cos\Delta_R)-\cos\Delta(\sin\Delta_F-\sin\Delta_R)] \quad (8.26b)$$

where
$M_y$=Moment about y-axis (Nm)
Considering in the example shown pure pitch of the platform, e.g., rotation with respect to the y-axis only, as illustrated in FIG. 18C, $\Delta_R = -\Delta_F = \Delta_{FR}$ and:

$$F_z = 3IK\sin(\Delta)\cos(\Delta_{FR}) \quad (8.27)$$

$$M_y = -1.5IKd_x\cos(\Delta)\sin(\Delta_{FR}) \quad (8.28)$$

Similar to the approach of open loop roll stabilization discussed before, in the exemplary embodiment illustrated of open loop pitch stabilization, the pitch of the platform is expected to be small.

Thus, $|\Delta_{FR}|$=small
and accordingly $$F_z = 3IK\sin(\Delta) \quad (8.29)$$

$$M_y = -1.5IKd_x\cos(\Delta)\Delta_{FR} = -[1.5\pi IKd_x^2\cos(\Delta)/p]R_y \quad (8.30)$$

where
$R_y$=Rotation about y-axis (rad)
and $M_y$ is a stabilization moment providing pitch stiffness that depends on K, $d_x$, p, I and $\Delta$. (As mentioned above, it should be noted that in the exemplary embodiment amplitude commutation may not provide stabilization moment ($\Delta=\pi/2 \Rightarrow M_y=0$).)

The control parameter $\Delta$ may thus be established as:

$$\Delta = a\sin[F_z/(3KI)] \quad (8.31)$$

Similar as in Equation (8.7). Similar to what was previously described, in the alternative, amplitude I and phase $\Delta$ may be calculated together in the exemplary embodiment to keep pitch stiffness constant. As another alternative, amplitude I can be used to produce Maxwell forces for guidance control in y-direction.

Figure 18D:
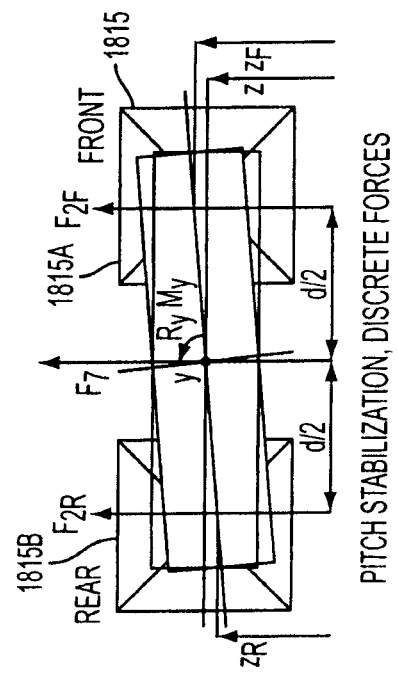

FIG. 18D shows another schematic side view of the motor 1815' in accordance with another exemplary embodiment, illustrating open loop pitch stabilization with distributed forces. In the embodiment illustrated, motor 1815' may be a single motor or winding set distributed substantially continuously along the side of the platform.

In the exemplary embodiment the force distribution may be expressed for example as:

$$f_z(x) = 1.5KI\sin[\Delta-\Delta_P(x)] = 1.5KI[\sin\Delta\cos\Delta_P(x)-\cos\Delta\sin\Delta_P(x)] \quad (8.32)$$

where
$f_z$=Distribution of z-force (N/m)
$\Delta_P$=Electrical angle offset corresponding to displacement due to pitch (rad)

Considering small pitch angle and, therefore, $|\Delta_P|$=small:

$$f_z(x) \approx 1.5KI[\sin(\Delta)-\cos(\Delta)\Delta_P(x)] = 1.5KI\{\sin(\Delta)-[2\pi R_y\cos(\Delta)/p]x\} \quad (8.33)$$

The total force and moment may be expressed for example as:

$$F_z = \int_{-d_x/2}^{+d_x/2} f_z(x)dx \approx 1.5KI \int_{-d_x/2}^{+d_x/2} \{\sin(\Delta) - [2\pi R_y \cos(\Delta)/p]x\}dx = \quad (8.34)$$
$$1.5KId_x \sin(\Delta)$$

$$M_y = \int_{-d_x/2}^{+d_x/2} xf_z(x)dx \approx 1.5KI \int_{-d_x/2}^{+d_x/2} x\{\sin(\Delta) - [2\pi R_y \cos(\Delta)/p]x\}dx = \quad (8.35)$$
$$-[\pi KI d_x^3 \cos(\Delta)/(4p)]R_y$$

where $M_y$ is a stabilization moment providing pitch stiffness that depends on K, $d_x$, p, I and Δ. (As described before, the amplitude commutation may not provide stabilization moment ($\Delta=\pi/2 \Rightarrow M_y=0$).)

The control parameter may be established as:

$$\Delta = a \sin[F_z/(1.5KId_x)] \quad (8.36)$$

Similar to embodiments above, in the alternative, amplitude I and phase Δ may be calculated together in the exemplary embodiment to keep pitch stiffness constant. As another alternative, amplitude I can be used to produce Maxwell forces for guidance control in the y-direction. In alternate embodiments, applicable equally to all of the roll and pitch stabilization cases similar to those previously described, this mechanism can be used to control stiffness in a closed loop manner, provided that roll or pitch measurements are available for feedback use. This nonetheless would keep the controls hardware simple on the motor amplifier side.

Figure 19:
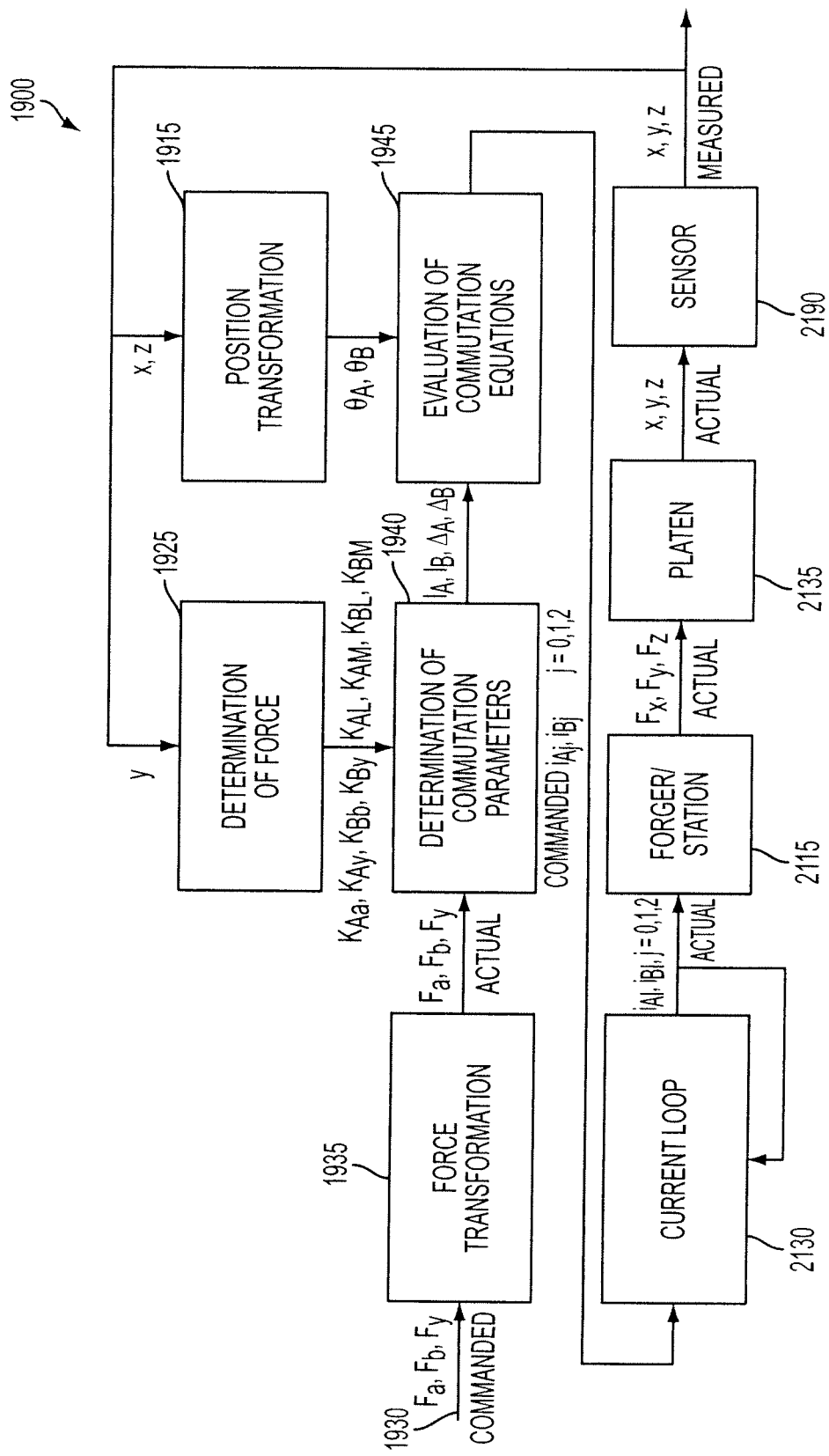
FIG. 19 shows a general block diagram of motor commutation applicable to the disclosed embodiments And FIGS. 20A-20D are yet other schematic cross-sectional views of a motor, showing respective force vectors acting between forcer and platen generating propulsion and guidance forces in accordance with yet another exemplary embodiment.
Figure 20A:
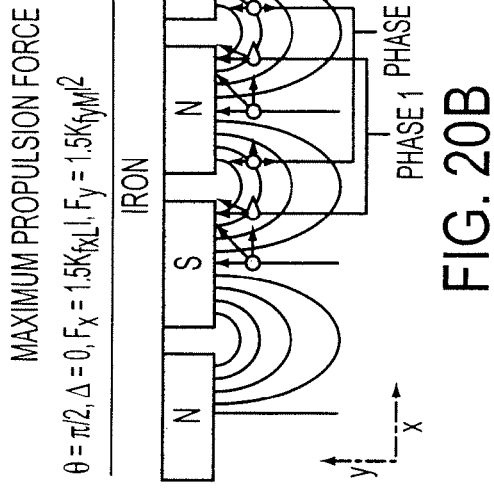
Figure 20B:
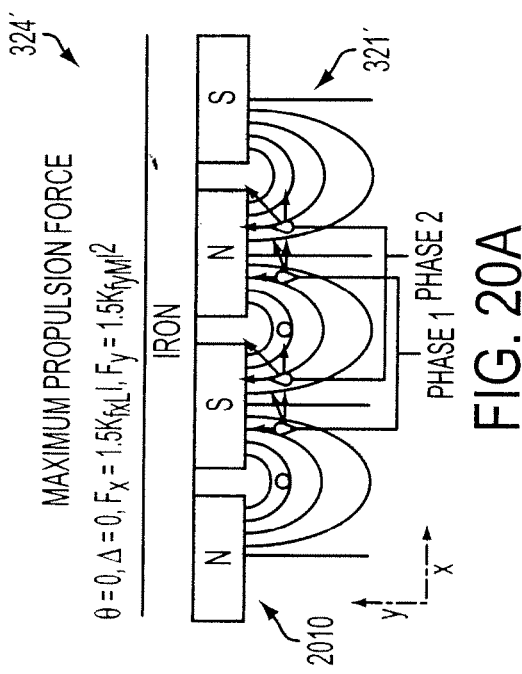
Figure 20C:
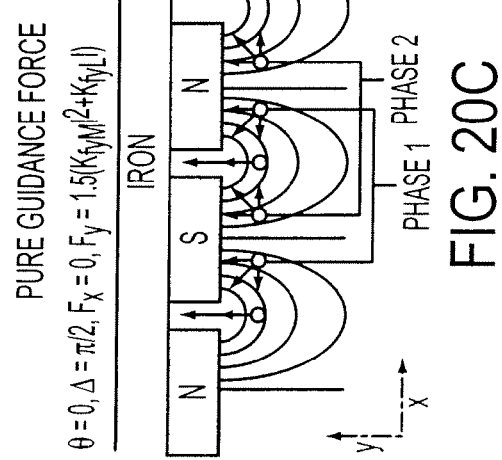
Figure 20D:
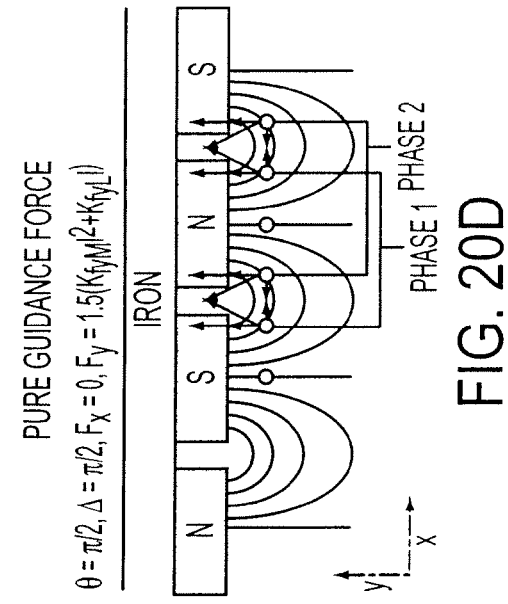

FIG. 19 shows a general block diagram of an integrated motor commutation system 1900 for combined three dimensional control (e.g. propulsion in X, Z directions and guidance in Y direction) applicable to the disclosed embodiments (see also FIG. 13A). The system arrangement illustrated in FIG. 19 is generally similar to the control system arrangements illustrated in a more specific manner in FIGS. 15-17, and similar features are similarly numbered.

In the exemplary embodiment illustrated, the control system 1900 may perform commutation of the windings of forcer 2115 to effect control of the platen or transport apparatus 2135 (similar to apparatus 1305 in FIG. 13A) in the X and Z directions (e.g. propulsion and lift respectively, see FIG. 13A) using Lorentz forces, and in the Y-direction (e.g. guidance) using Lorentz and Maxwell forces in a manner similar to that described before (see also FIG. 15). In alternate embodiments, and as also described previously, the control system may be arranged to effect commutation of forcer windings for three dimensional control of the transport using for example Lorentz forces for propulsion, lift and guidance, or using Lorentz forces for propulsion and lift and Maxwell forces for guidance. In the exemplary embodiment, in a manner generally similar to that described before, position feedback information from sensors 2190 (similar to sensors 1390, 1395 in FIG. 13A), such as X and Z position, may be communicated to the position transform 1915. In the exemplary embodiment, position transform 1915 may include suitable electrical angle determination circuitry capable of determining the corresponding electrical angles $\theta_A$ $\theta_B$ (e.g. for A, B winding segments of the forcer 2115; (see also FIGS. 13C, 13D1-13D2)). Position feedback information, such as Y position, may be communicated to the force constant determination block 1925 suitably arranged to determine the force constant parameters for the forcer winding sets (e.g. forcer winding sets A, B). As may be realized, control system 1900 may be communicably connected to, or may include suitable command processor(s) (not shown) arranged to identify desired X, Y, Z forces (e.g. $F_x$, $F_y$, $F_z$) desired for effecting transport commands. As seen in FIG. 19, in the exemplary embodiment, the desired force parameter 1930 may be communicated to force transform 1935, that may be suitably programmed to translate x, y, z, direction forces to forces corresponding to the winding reference frame (e.g. $F_a$, $F_b$, $F_y$, in the example where the forcer 2115 has A, B windings). The system may include commutation parameter determination circuitry or program 1940 arranged to determine the commutation parameters such as $I_A$, $I_B$, $\Delta_A$, $\Delta_B$ in a manner similar to that previously described and commutation equation determination program or circuitry 1945 defines the resultant commutation equations communicated to the current loop 2130 that implements the commutation equations to provide currents (e.g. $i_{Aj}$, $i_{Bj}$, j=0, 1, 2) for the station/forcer windings thereby effecting desired three dimensional control of the transport. In alternate embodiments, the control system may have any other desired arrangement.

The embodiments disclosed above provide sets of motor force equations, motor commutation equations, and expressions for calculation of motor control parameters based on specified propulsion and guidance forces, for both two dimensional and three dimensional motor configurations. The disclosed embodiments include adjusting an electrical angle used to drive a common set of commutation functions with an electrical angle offset so that the same motor commutation functions may be used for producing at least a one dimensional propulsion force in the x-direction, two dimensional forces including a propulsion force in the x-direction and a guidance force in the y-direction, and three dimensional forces including propulsion forces in both the x-direction and a z-direction and a guidance force in the y-direction. In addition, motor force equations, motor commutation equations, and motor control parameter calculations are provided for phase commutation with open loop stabilization, including open loop roll stabilization, open loop pitch stabilization with discrete forces, and open loop pitch stabilization with distributed forces.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of commutating a motor comprising:
   calculating an electrical angle offset;
   applying the electrical angle offset to an electrical angle in a common set of commutation equations for a three phase motor for producing a one dimensional force so that the common set of commutation equations is capable of producing both one and two dimensional forces in the motor; and
   varying the electrical angle offset as applied within the common set of commutation equations to control the three phase motor so that both of the two dimensional forces produced by the motor are independently controllable.

2. The method of claim 1, wherein the electrical angle offset is determined from one or more measured position coordinates of a platen of the motor and desired motor forces in one or more directions.

3. The method of claim 1, further comprising applying the electrical angle offset to the electrical angle in the common set of commutation equations so that the two dimensional forces in the motor include Maxwell forces.

4. The method of claim 1, further comprising applying the electrical angle offset in the common set of commutation equations so that the common set of commutation equations is capable of producing three dimensional forces in the motor.

5. The method of claim 4, further comprising applying the electrical angle offset in the common set of commutation equations so that the three dimensional forces in the motor include Maxwell forces.

6. The method of claim 1, further comprising utilizing a winding phase current in combination with the electrical angle offset in the common set of commutation equations.

7. The method of claim 1, further comprising selecting a predetermined parameter relating forces generated by one or more winding sets of the motor, by utilizing a maximum rated force of the one or more winding sets of the motor.

8. The method of claim 7, wherein the maximum rated force of at least one of the one or more winding sets is determined using back electromotive force, and motor speed.

9. The method of claim 1, further comprising selecting a predetermined parameter relating forces generated by one or more winding sets of the motor, by utilizing a maximum phase current amplitude of at least one of the one or more winding sets of the motor.

10. The method of claim 1, further comprising selecting a predetermined parameter relating forces generated by one or more winding sets of the motor by utilizing a maximum rated power of at least one of the one or more winding sets of the motor.

11. The method of claim 1, further comprising applying the electrical angle offset to the electrical angle in the common set of commutation equations to provide open loop roll stabilization of the motor.

12. The method of claim 1, further comprising applying the electrical angle offset to the electrical angle in the common set of commutation equations to provide open loop pitch stabilization of the motor.

13. A method of commutating a motor comprising:
calculating an electrical angle offset;
entering the electrical angle offset as an adjustment to an electrical angle into commutation equations for a three phase motor for commutating motor windings of the three phase motor to produce forces in the motor in one dimension, wherein the electrical angle offset is determined so that the commutation equations for producing forces in the three phase motor in the one dimension are common with commutation equations for simultaneously producing forces in the motor in two dimensions; and
varying the electrical angle offset as applied within the common commutation equations to control the three phase motor so that both of the two dimensional forces produced by the motor are independently controllable.

14. The method of claim 13, further comprising determining the electrical angle offset so that the commutation equations for simultaneously producing forces in the motor in two dimensions produce Maxwell forces.

15. The method of claim 13, wherein the electrical angle offset is determined so that the commutation equations for producing forces in the motor in the at least one dimension are common with commutation equations for simultaneously producing forces in the motor in three dimensions.

16. The method of claim 15, further comprising determining the electrical angle offset so that the commutation equations for simultaneously producing forces in the motor in the three dimensions produce Maxwell forces.

17. An apparatus for commutating a motor comprising:
circuitry for calculating an electrical angle offset; and
an amplifier operable to apply the electrical angle offset to an electrical angle in a common set of commutation equations for a three phase motor for producing a one dimensional force so that the common set of commutation equations is capable of producing both one and two dimensional forces in the motor,
the amplifier configured to vary the electrical angle offset as applied within the common set of commutation equations to control the three phase motor so that both of the two dimensional forces produced by the motor are independently controllable.

18. The apparatus of claim 17, further comprising circuitry operable to determine the electrical angle offset from one or more measured position coordinates of a platen of the motor and desired motor forces in one or more directions.

19. The apparatus of claim 17, wherein the amplifier is further operable to apply the electrical angle offset to the electrical angle in the common set of commutation equations so that the two dimensional forces in the motor include Maxwell forces.

20. The apparatus of claim 17, wherein the amplifier is further operable to apply the electrical angle offset to the electrical angle in the common set of commutation equations so that the common set of commutation equations is capable of producing three dimensional forces in the motor.

21. The apparatus of claim 20, wherein the amplifier is further operable to apply the electrical angle offset to the electrical angle in the common set of commutation equations so that the three dimensional forces in the motor include Maxwell forces.

22. The apparatus of claim 17, wherein the amplifier is further operable to utilize a winding phase current in combination with the electrical angle offset in the common set of commutation equations.

23. The apparatus of claim 17, further comprising circuitry for selecting a predetermined parameter relating forces generated by one or more winding sets of the motor utilizing a maximum rated force of the one or more winding sets of the motor.

24. The apparatus of claim 23, wherein the maximum rated force of the one or more winding sets is determined using back electromotive force, and motor speed.

25. The apparatus of claim 17, further comprising circuitry for selecting a predetermined parameter relating forces generated by one or more winding sets of the motor by utilizing a maximum phase current amplitude of at least one of the one or more winding sets of the motor.

26. The apparatus of claim 17, further comprising circuitry for selecting predetermined parameter relating forces generated by one or more winding sets of the motor by utilizing a maximum rated power of at least one of the one or more winding sets of the motor.

27. The apparatus of claim 17, wherein the amplifier is further operable to apply the electrical angle offset to the electrical angle in the common set of commutation equations to provide open loop roll stabilization of the motor.

28. The apparatus of claim 17, wherein the amplifier is further operable to apply the electrical angle offset to the electrical angle in the common set of commutation equations to provide open loop pitch stabilization of the motor.

29. A motor comprising:
windings commutated by a controller, the controller having:

circuitry for calculating an electrical angle offset; and
an amplifier operable to apply the electrical angle offset to an electrical angle in a common set of commutation equations for a three phase motor for producing a one dimensional force so that the common set of commutation equations is capable of producing both one and two dimensional forces in the motor,
the amplifier further operable to vary the electrical angle offset as applied within the common set of commutation equations to control the three phase motor so that both of the two dimensional forces produced by the motor are independently controllable.

30. The motor of claim 29, wherein the controller further comprises circuitry operable to determine the electrical angle offset from one or more measured position coordinates of a platen of the motor and desired motor forces in one or more directions.

31. The motor of claim 29, wherein the amplifier is further operable to apply the electrical angle offset to the electrical angle in the common set of commutation equations so that the two dimensional forces in the motor include Maxwell forces.

32. The motor of claim 29, wherein the amplifier is further operable to apply the electrical angle offset to the electrical angle in the common set of commutation equations so that the common set of commutation equations is capable of producing three dimensional forces in the motor.

33. The motor of claim 32, wherein the amplifier is further operable to apply the electrical angle offset to the electrical angle in the common set of commutation equations so that the three dimensional forces in the motor include Maxwell forces.

34. The motor of claim 29, wherein the amplifier is further operable to utilize a winding phase current in combination with the electrical angle offset in the common set of commutation equations.

35. The motor of claim 29, wherein the controller further comprises circuitry operable for selecting a predetermined parameter relating forces generated by one or more winding sets of the motor by utilizing a maximum rated force of the one or more winding sets of the motor.

36. The motor of claim 35, wherein the maximum rated force of the one or more winding sets is determined using back electromotive force, and motor speed.

37. The motor of claim 29, wherein the controller further comprises circuitry operable for selecting a predetermined parameter relating forces generated by one or more winding sets of the motor by utilizing a maximum phase of the one or more current amplitude of at least one of the one or more winding sets of the motor.

38. The motor of claim 29, wherein the controller further comprises circuitry operable for selecting a predetermined parameter relating forces generated by one or more winding sets of the motor by utilizing a maximum rated power of at least one or more winding sets of the motor.

39. The motor of claim 29, wherein the amplifier is further operable to apply the electrical angle offset to the electrical angle in the common set of commutation equations to provide open loop roll stabilization of the motor.

40. The motor of claim 29, wherein the amplifier is further operable to apply the electrical angle offset to the electrical angle in the common set of commutation equations to provide open loop pitch stabilization of the motor.

41. A substrate processing apparatus comprising:
a controller for commutating a motor including:
circuitry for calculating an electrical angle offset; and
an amplifier operable to apply the electrical angle offset to an electrical angle in a common set of commutation equations for a three phase motor for producing a one dimensional force so that the common set of commutation equations is capable of producing both one and two dimensional forces in the motor,
the amplifier further operable to vary the electrical angle offset as applied within the common set of commutation equations to control the three phase motor so that both of the two dimensional forces produced by the motor are independently controllable.

42. The substrate processing apparatus of claim 41, wherein the controller further comprises circuitry operable to determine the electrical angle offset from one or more measured position coordinates of a platen of the motor and desired motor forces in one or more directions.

43. The substrate processing apparatus of claim 41, wherein the amplifier is further operable to apply the electrical angle offset to the electrical angle in the common set of commutation equations so that the two dimensional forces in the motor include Maxwell forces.

44. The substrate processing apparatus of claim 41, wherein the amplifier is further operable to apply the electrical angle offset to the electrical angle in the common set of commutation equations so that the common set of commutation equations is capable of producing three dimensional forces in the motor.

45. The substrate processing apparatus of claim 44, wherein the amplifier is further operable to apply the electrical angle offset to the electrical angle in the common set of commutation equations so that the three dimensional forces in the motor include Maxwell forces.

46. The substrate processing apparatus of claim 41, wherein the amplifier is further operable to utilize a winding phase current in combination with the electrical angle offset in the common set of commutation equations.

47. The substrate processing apparatus of claim 41, wherein the controller further comprises circuitry operable for selecting a predetermined parameter relating forces generated by one or more winding sets of the motor by utilizing a maximum rated force of the one or more winding sets of the motor.

48. The substrate processing apparatus of claim 47, wherein the maximum rated force of the one or more winding sets is determined using back electromotive force, and motor speed.

49. The substrate processing apparatus of claim 41, wherein the controller further comprises circuitry operable for selecting a predetermined parameter relating forces generated by one or more winding sets of the motor by utilizing a maximum current amplitude of at least one of the one or more winding sets of the motor.

50. The substrate processing apparatus of claim 41, wherein the controller further comprises circuitry operable for selecting a predetermined parameter relating forces generated by one or more winding sets of the motor by utilizing a maximum rated power at least one of the one or more winding sets of the motor.

51. The substrate processing apparatus of claim 41, wherein the amplifier is further operable to apply the electrical angle offset to the electrical angle in the common set of commutation equations to provide open loop roll stabilization of the motor.

52. The substrate processing apparatus of claim 41, wherein the amplifier is further operable to apply the electrical angle offset to the electrical angle in the common set of commutation equations to provide open loop pitch stabilization of the motor.

* * * * *